US012717555B2

(12) United States Patent
Kuperman

(10) Patent No.: US 12,717,555 B2
(45) Date of Patent: Aug. 25, 2026

(54) AI ENABLER FOR APPLICATION PERFORMANCE AUTOMATION

(71) Applicant: CAST AI Group, Inc., Miami, FL (US)

(72) Inventor: Leonid Kuperman, North York (CA)

(73) Assignee: CAST AI Group, Inc., Miami, FL (US)

( * ) Notice: Subject to any disclaimer, the term of this patent is extended or adjusted under 35 U.S.C. 154(b) by 0 days.

(21) Appl. No.: 19/201,778

(22) Filed: May 7, 2025

(65) Prior Publication Data

US 2026/0228037 A1 Aug. 6, 2026

Related U.S. Application Data

(60) Provisional application No. 63/754,652, filed on Feb. 6, 2025.

(51) Int. Cl.
*G06F 9/455* (2018.01)
*G06F 9/48* (2006.01)
*G06F 11/34* (2006.01)

(52) U.S. Cl.
CPC ........ *G06F 9/4856* (2013.01); *G06F 11/3409* (2013.01); *G06F 2209/482* (2013.01)

(58) Field of Classification Search
CPC .................................................... G06F 9/4856
USPC ............................................................ 718/1
See application file for complete search history.

(56) References Cited

U.S. PATENT DOCUMENTS 11,620,207 B2 * 4/2023 Vega .................. G06F 11/3006 702/182
11,966,776 B2 * 4/2024 Amarnath ............ G06F 9/4881
12,236,193 B1 * 2/2025 Kuperman ............ G06F 40/284
12,367,396 B1 * 7/2025 Rauschmayr .......... G06N 3/088
2017/0034023 A1 * 2/2017 Nickolov ............ H04L 43/0817
2019/0095478 A1 * 3/2019 Tankersley .......... G06F 11/3419
2020/0394130 A1 12/2020 Pande et al.
2021/0182729 A1 * 6/2021 George ................. G06N 20/00

(Continued)

FOREIGN PATENT DOCUMENTS

CN 114612450 B 9/2023

OTHER PUBLICATIONS

United States Office Action, U.S. Appl. No. 19/201,770, filed Jun. 17, 2025, 22 pages.

(Continued)

*Primary Examiner* — Mehran Kamran
(74) *Attorney, Agent, or Firm* — Fenwick & West LLP

(57) ABSTRACT

A system for large language model (LLM) deployment dynamically provisions GPU resources across availability zones (AZs) to ensure scalable and cost-effective inference. The system initially provisions a node in a first cluster within a first AZ and receives a request to deploy an LLM. The system determines the GPU resource requirements for operating the LLM, then collects and analyzes real-time metrics—such as availability, pricing, and performance—across multiple alternative AZs containing diverse compute resources. Based on this analysis, the system selects a second AZ optimized for GPU resource efficiency and provisions a second node in a separate cluster. This second node is logically registered as a virtual node within the original cluster, allowing seamless deployment of the LLM while maintaining transparency and performance.

20 Claims, 21 Drawing Sheets

(56) References Cited

U.S. PATENT DOCUMENTS

2022/0038434 A1* 2/2022 Murray ................. H04L 63/029
2022/0121455 A1* 4/2022 Hoban .................. G06F 9/5027
2022/0201673 A1* 6/2022 Pandey ............... H04L 41/0803
2022/0237044 A1* 7/2022 Shah ................... G06F 11/3433
2022/0269548 A1* 8/2022 Dwivedi ............. G06F 11/3006
2023/0236902 A1* 7/2023 Zhao ..................... G06F 9/5044
718/105
2023/0342278 A1* 10/2023 Padmanabha Iyer .. G06N 5/043
2024/0111263 A1* 4/2024 Namburi .............. G05B 19/042
2024/0232039 A1* 7/2024 Isaac ...................... G06N 20/00
2024/0291839 A1* 8/2024 Yagnik .................. H04L 51/214
2024/0428275 A1 12/2024 Luus et al.
2025/0045256 A1* 2/2025 Gottlob ................. G06F 16/211
2025/0053870 A1* 2/2025 Sahin ..................... G06N 20/00
2025/0117699 A1* 4/2025 Cheng .................... G06N 20/00
2025/0146842 A1* 5/2025 Ding ................... G01M 5/0091
2025/0148222 A1* 5/2025 Schornig .............. G06N 3/0455
2025/0173173 A1* 5/2025 Geckeler ............. G06F 9/45558
2025/0173183 A1* 5/2025 Trikande ............... G06F 9/5027
2025/0175423 A1* 5/2025 Vippagunta ............. H04L 45/70
2025/0190257 A1* 6/2025 Ananthanarayanan ......................
G06F 9/5027
2025/0200073 A1 6/2025 Ragukumar et al.
2025/0238638 A1* 7/2025 Ouyang .................. G06F 40/51
2025/0240220 A1* 7/2025 Poothiyot ........... G06F 11/2038
2025/0323975 A1* 10/2025 Filippou ............... H04W 12/06

OTHER PUBLICATIONS

United States Office Action, U.S. Appl. No. 19/201,770, filed Oct. 2, 2025, 30 pages.

Nam D. et al., Prompting LLMs for Code Editing: Struggles and Remedies, arXiv, Apr. 28, 2025, retrieved online Jul. 3, 2025, pp. 1-16. Retrieved from the internet: <URL: https://arxiv.org/pdf/2504.20196v1> (Year: 2025).

United States Office Action, U.S. Appl. No. 19/201,782, filed Jul. 15, 2025, 24 pages.

* cited by examiner

600

Figure 8:
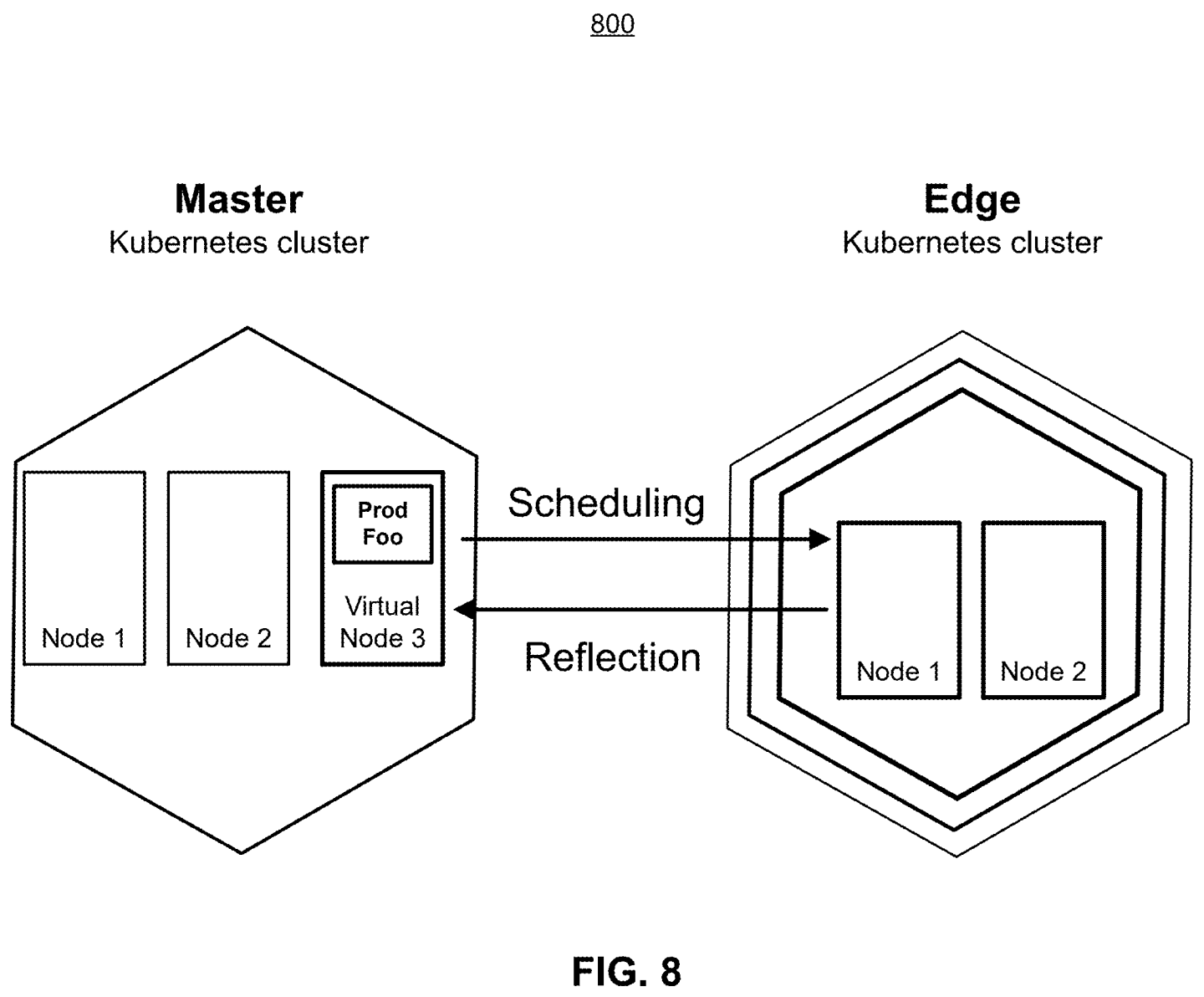

800

Master
Kubernetes cluster

Node 1

Node 2

Prod
Foo

Virtual
Node 3

Scheduling

Reflection

Edge
Kubernetes cluster

Node 1

Node 2

Figure 9:
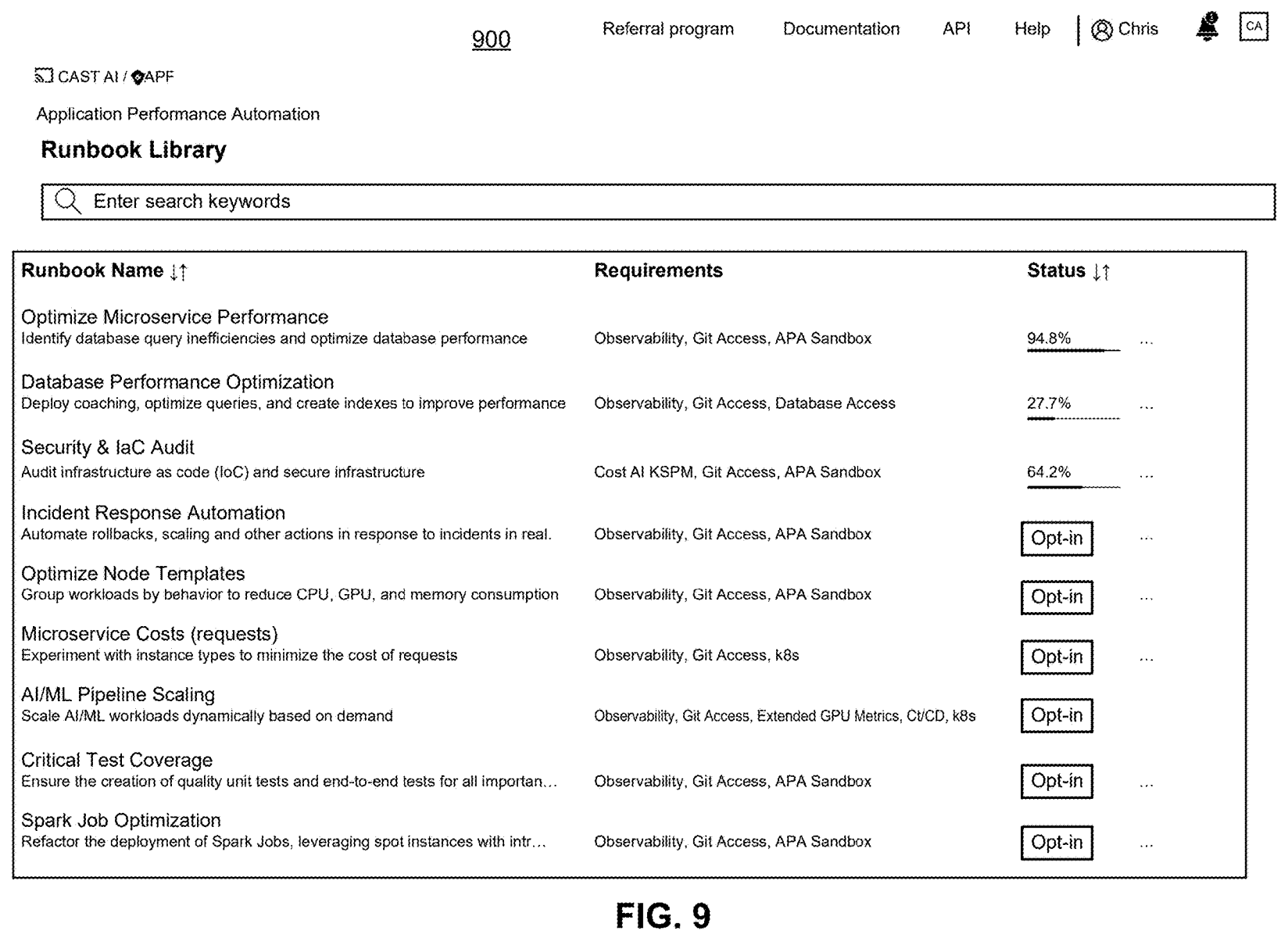

Referral program Documentation API Help | Chris CA

CAST AI / APF

Application Performance Automation

Runbook Library

Enter search keywords

| Runbook Name | Requirements | Status | |
|---|---|---|---|
| Optimize Microservice Performance<br>Identify database query inefficiencies and optimize database performance | Observability, Git Access, APA Sandbox | 94.8% | ... |
| Database Performance Optimization<br>Deploy coaching, optimize queries, and create indexes to improve performance | Observability, Git Access, Database Access | 27.7% | ... |
| Security & IaC Audit<br>Audit infrastructure as code (IoC) and secure infrastructure | Cost AI KSPM, Git Access, APA Sandbox | 64.2% | ... |
| Incident Response Automation<br>Automate rollbacks, scaling and other actions in response to incidents in real. | Observability, Git Access, APA Sandbox | Opt-in | ... |
| Optimize Node Templates<br>Group workloads by behavior to reduce CPU, GPU, and memory consumption | Observability, Git Access, APA Sandbox | Opt-in | ... |
| Microservice Costs (requests)<br>Experiment with instance types to minimize the cost of requests | Observability, Git Access, k8s | Opt-in | ... |
| AI/ML Pipeline Scaling<br>Scale AI/ML workloads dynamically based on demand | Observability, Git Access, Extended GPU Metrics, CI/CD, k8s | Opt-in | |
| Critical Test Coverage<br>Ensure the creation of quality unit tests and end-to-end tests for all importan... | Observability, Git Access, APA Sandbox | Opt-in | ... |
| Spark Job Optimization<br>Refactor the deployment of Spark Jobs, leveraging spot instances with intr... | Observability, Git Access, APA Sandbox | Opt-in | ... |

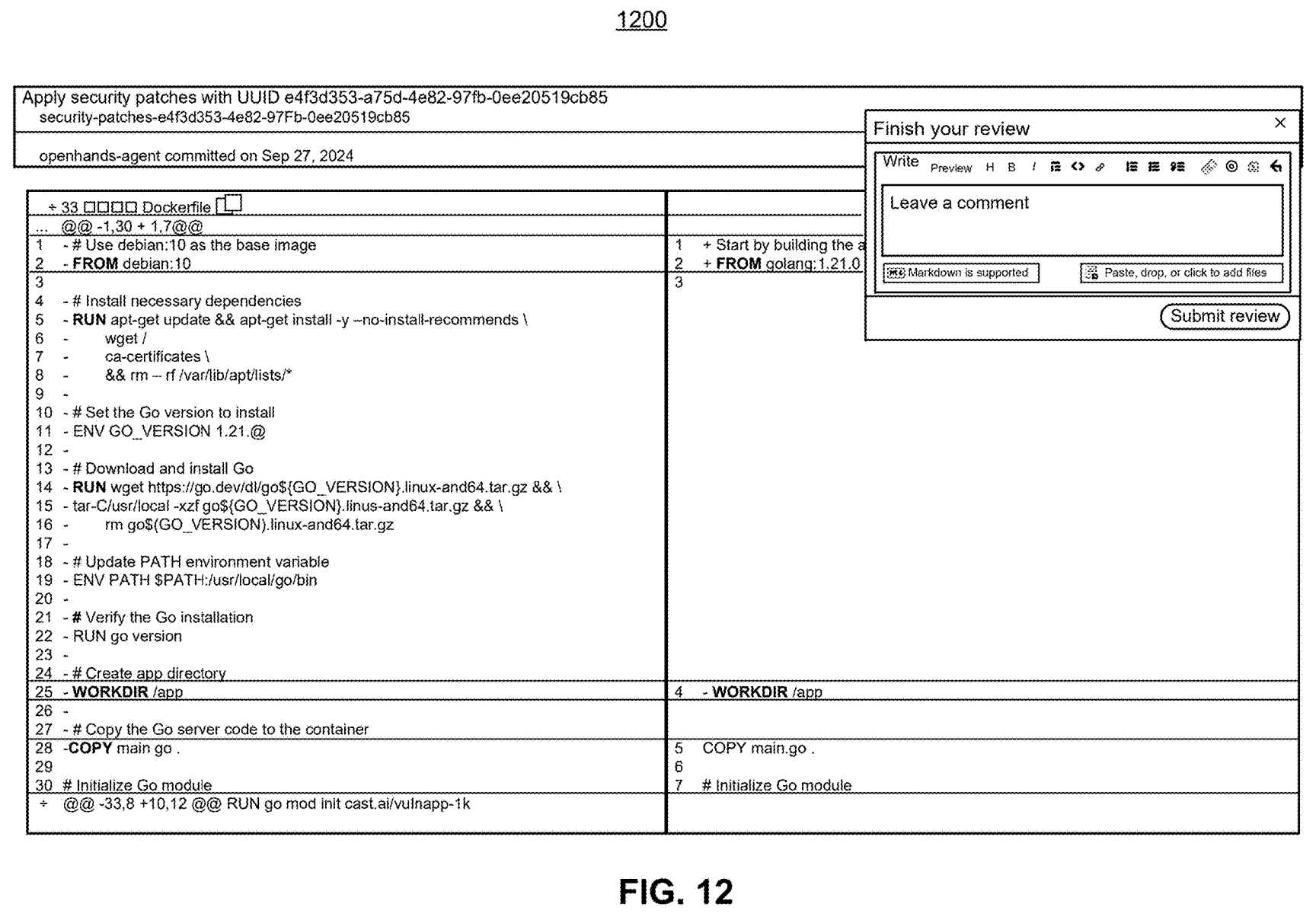

Apply security patches with UUID e4f3d353-a75d-4e82-97fb-0ee20519cb85
security-patches-e4f3d353-4e82-97Fb-0ee20519cb85 openhands-agent committed on Sep 27, 2024

Finish your review

Write Preview H B I

Leave a comment

Markdown is supported

Paste, drop, or click to add files

Submit review

```
÷ 33 □□□□ Dockerfile
... @@ -1,30 + 1,7@@
- # Use debian:10 as the base image
- FROM debian:10

- # Install necessary dependencies
- RUN apt-get update && apt-get install -y --no-install-recommends \
-       wget /
-       ca-certificates \
-       && rm -- rf /var/lib/apt/lists/*
-
- # Set the Go version to install
- ENV GO_VERSION 1.21.@
-
- # Download and install Go
- RUN wget https://go.dev/dl/go${GO_VERSION}.linux-and64.tar.gz && \
- tar-C/usr/local -xzf go${GO_VERSION}.linus-and64.tar.gz && \
-       rm go$(GO_VERSION).linux-and64.tar.gz
-
- # Update PATH environment variable
- ENV PATH $PATH:/usr/local/go/bin
-
- # Verify the Go installation
- RUN go version
-
- # Create app directory
- WORKDIR /app
-
- # Copy the Go server code to the container
-COPY main go .

# Initialize Go module
÷ @@ -33,8 +10,12 @@ RUN go mod init cast.ai/vulnapp-1k
```

```
+ Start by building the a
+ FROM golang:1.21.0

- WORKDIR /app
COPY main.go .

# Initialize Go module
```

FIG. 12

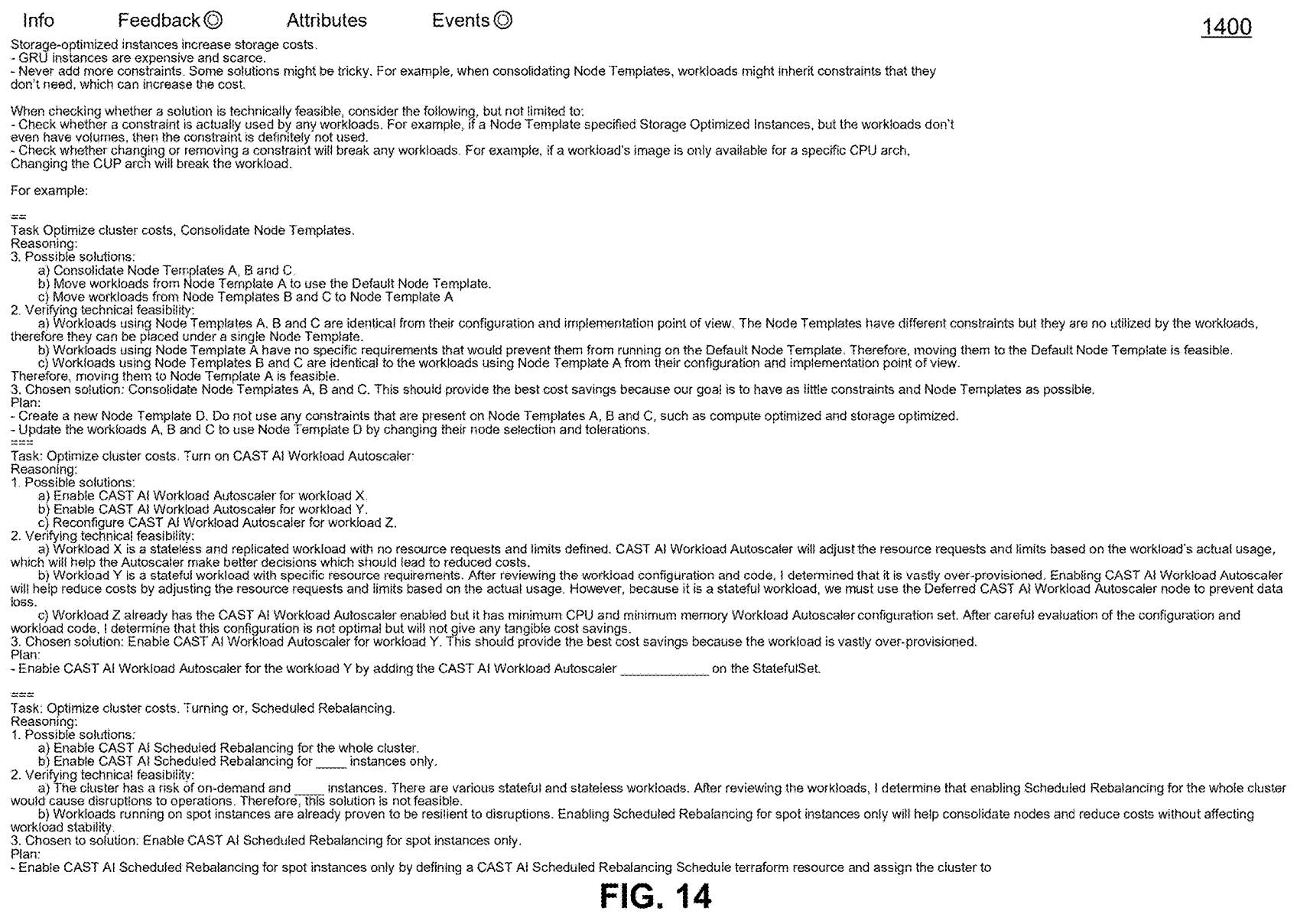

Info Feedback◎ Attributes Events◎

1400

Storage-optimized instances increase storage costs.
- GRU instances are expensive and scarce.
- Never add more constraints. Some solutions might be tricky. For example, when consolidating Node Templates, workloads might inherit constraints that they don't need, which can increase the cost.

When checking whether a solution is technically feasible, consider the following, but not limited to:
- Check whether a constraint is actually used by any workloads. For example, if a Node Template specified Storage Optimized Instances, but the workloads don't even have volumes, then the constraint is definitely not used.
- Check whether changing or removing a constraint will break any workloads. For example, if a workload's image is only available for a specific CPU arch, Changing the CUP arch will break the workload.

For example:

==
Task Optimize cluster costs, Consolidate Node Templates.
Reasoning:
3. Possible solutions:
a) Consolidate Node Templates A, B and C.
b) Move workloads from Node Template A to use the Default Node Template.
c) Move workloads from Node Templates B and C to Node Template A
2. Verifying technical feasibility:
a) Workloads using Node Templates A, B and C are identical from their configuration and implementation point of view. The Node Templates have different constraints but they are no utilized by the workloads, therefore they can be placed under a single Node Template.
b) Workloads using Node Template A have no specific requirements that would prevent them from running on the Default Node Template. Therefore, moving them to the Default Node Template is feasible.
c) Workloads using Node Templates B and C are identical to the workloads using Node Template A from their configuration and implementation point of view.
Therefore, moving them to Node Template A is feasible.
3. Chosen solution: Consolidate Node Templates A, B and C. This should provide the best cost savings because our goal is to have as little constraints and Node Templates as possible.
Plan:
- Create a new Node Template D. Do not use any constraints that are present on Node Templates A, B and C, such as compute optimized and storage optimized.
- Update the workloads A, B and C to use Node Template D by changing their node selection and tolerations.
===
Task: Optimize cluster costs. Turn on CAST AI Workload Autoscaler:
Reasoning:
1. Possible solutions:
a) Enable CAST AI Workload Autoscaler for workload X.
b) Enable CAST AI Workload Autoscaler for workload Y.
c) Reconfigure CAST AI Workload Autoscaler for workload Z.
2. Verifying technical feasibility:
a) Workload X is a stateless and replicated workload with no resource requests and limits defined. CAST AI Workload Autoscaler will adjust the resource requests and limits based on the workload's actual usage, which will help the Autoscaler make better decisions which should lead to reduced costs.
b) Workload Y is a stateful workload with specific resource requirements. After reviewing the workload configuration and code, I determined that it is vastly over-provisioned. Enabling CAST AI Workload Autoscaler will help reduce costs by adjusting the resource requests and limits based on the actual usage. However, because it is a stateful workload, we must use the Deferred CAST AI Workload Autoscaler node to prevent data loss.
c) Workload Z already has the CAST AI Workload Autoscaler enabled but it has minimum CPU and minimum memory Workload Autoscaler configuration set. After careful evaluation of the configuration and workload code, I determine that this configuration is not optimal but will not give any tangible cost savings.
3. Chosen solution: Enable CAST AI Workload Autoscaler for workload Y. This should provide the best cost savings because the workload is vastly over-provisioned.
Plan:
- Enable CAST AI Workload Autoscaler for the workload Y by adding the CAST AI Workload Autoscaler ____________ on the StatefulSet.

===
Task: Optimize cluster costs. Turning or, Scheduled Rebalancing.
Reasoning:
1. Possible solutions:
a) Enable CAST AI Scheduled Rebalancing for the whole cluster.
b) Enable CAST AI Scheduled Rebalancing for _____ instances only.
2. Verifying technical feasibility:
a) The cluster has a risk of on-demand and _____ instances. There are various stateful and stateless workloads. After reviewing the workloads, I determine that enabling Scheduled Rebalancing for the whole cluster would cause disruptions to operations. Therefore, this solution is not feasible.
b) Workloads running on spot instances are already proven to be resilient to disruptions. Enabling Scheduled Rebalancing for spot instances only will help consolidate nodes and reduce costs without affecting workload stability.
3. Chosen to solution: Enable CAST AI Scheduled Rebalancing for spot instances only.
Plan:
- Enable CAST AI Scheduled Rebalancing for spot instances only by defining a CAST AI Scheduled Rebalancing Schedule terraform resource and assign the cluster to

FIG. 14

Collect context of an application in a cloud environment based on one or more metadata, source code files, or configuration files
1610

Collect telemetry data associated with performance of the application
1620

Generate an LLM prompt based on the collected context of the application, telemetry data associated with performance of the application, and a prompt schema
1630

Transmit the LLM prompt to an LLM, prompting the LLM to suggest (1) a modification to one or more source code files or configuration files to improve performance of the application, and (2) rationale of the suggested modification in natural language
1640

Receive output from the LLM including a suggested modification to one or more source code or configuring files and rationale of the suggested modification
1650

Present the suggested modification and the rationale of the suggested modification on a client device of a user for display
1660

FIG. 16

AI ENABLER FOR APPLICATION PERFORMANCE AUTOMATION

CROSS-REFERENCE TO RELATED APPLICATION

This application claims the benefit of U.S. Provisional Application No. 63/754,652, filed Feb. 6, 2025, which is incorporated by reference in its entirety.

TECHNICAL FIELD

This disclosure relates generally to cloud computing and artificial intelligence (AI), and more specifically, an application performance automation (APA) system configured to use AI models to optimize application performance in cloud computing environments.

BACKGROUND

Modern applications are distributed across many containers and microservices. These applications are deployed in cloud-native environments like Kubernetes™, and are constantly changing due to continuous integration and continuous delivery (CI/CD) pipelines. Existing observability tools can help developer teams understand what's happening inside complex software systems-especially distributed applications running across cloud infrastructure. They work by collecting telemetry data, such as logs, which are time-stamped text records of events (e.g., error messages, user actions, etc.), which may be searchable based on context, such as container name, service, host, among others.

While existing observability tools provide visibility into system performance, they face a fundamental limitation: they cannot bridge the gap between detection and resolution of issues. These tools generate data but lack the capability to connect disparate systems and facilitate automated remediation. For example, when latency spikes occur, observability tools might show high CPU usage, but cannot automatically correlate this with a specific deployment issue or orchestrate a resolution across system boundaries. This gap between detection and remediation often results in an inefficient and error-prone process.

SUMMARY

Embodiments described herein include methods and system for autonomous application performance optimization that address the above-described issues. The system collects telemetry data, such as logs, metrics, and traces, associated with an application operating in a production environment. The telemetry data is analyzed to detect one or more performance inefficiencies, such as elevated latency, excessive resource consumption, or suboptimal throughput.

Based on the detected inefficiencies, the system identifies an intervention based on the detected performance inefficiencies, deploys the intervention onto an application in a sandbox environment for validation. The system collects telemetry data about the application with the intervention applied in the sandbox environment, and analyzes the telemetry data to assess impact of the first intervention in the sandbox environment. The system determines whether performance of the application with the intervention has improved by at least a predetermined threshold.

In response to determining that the performance of the application with the first intervention has improved by at least a predetermined threshold, the intervention is deployed to the application in the production environment. Otherwise, the system identifies a second intervention based on the detected performance degradation of the application without the first intervention and the assessed impact of the first intervention, and deploys the second intervention onto the application in the sandbox environment for validation. This process may repeat as many times as necessary until an intervention with sufficient performance improvement is identified.

The embodiments described herein also include a method or system for automated code modification. The system collects context of an application in a cloud environment based on one or more of metadata, source code files, or configuration files associated with the application. The system also collects telemetry data associated with performance of the application. The system generates a large language model (LLM) prompt based on the collected context of the application, telemetry data associated with performance of the application, and a prompt schema. The LLM prompt is transmitted to an LLM, prompting the LLM to recommend (1) a modification to one or more of source code files or configuration files to improve performance of the application, and (2) rationale of the recommended modification in natural language. The system receives output from the LLM including the recommended modification to one or more of source code files or configuration files and rationale of the recommended modification, and presents the recommended modification and rationale of the recommended modification on a client device of a user for display.

The embodiments described herein also include a method or a system for LLM deployment. The system receives, at a first node of a first cluster in a first availability zone (AZ), a request to deploy a large language model (LLM). The system determines an amount of GPU resources that are to be used to operate the LLM. The system collects data associated with a plurality of AZs that include different types of compute resources. The compute resources include different types of CPUs and GPUs. The system analyzes data associated with a plurality of AZs that have GPU resources. The data includes metrics about the GPU resources in each of the plurality of AZs. The system selects a second AZ from the plurality of AZs based on the metrics about the GPU resources in the plurality of AZs, and provisions a second node including GPU resources from the second AZ as a node in a second cluster, registers the second node as a virtual node in the first cluster, and deploys the LLM onto the virtual node.

BRIEF DESCRIPTION OF THE DRAWINGS

FIG. 8 illustrates an example environment, in which an AI enabler of the APA system is able to a unified scheduling layer across geographically distributed GPU infrastructure, in accordance with one or more embodiments.

FIG. 9 illustrates an example user interface for a runbook library within an APA system, in accordance with one or more embodiments.

FIG. 12 illustrates another example GUI for the APA system that automatically generates updated code and a pull request, in accordance with one or more embodiments.

FIG. 14 illustrates an example LLM schema that guides how the APA system constructs an LLM prompt to ensure consistent response from an LLM, in accordance with one or more embodiments.

FIG. 16 illustrates an example method for interactive code generation via LLMs, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

As software systems increasingly adopt microservice-based architectures and are deployed across dynamic, cloud-native platforms, engineering teams are challenged to manage complexity at scale. Observability tools like DataDog™ have brought visibility into logs, metrics and traces, but they stop short of action—leaving engineers to interpret data and manually resolve issues under significant time pressure. This results in a persistent gap between detection and resolution.

The embodiments described herein relate to an application performance automation system (hereinafter also referred to as the "APA system" or simply "APA") that bridges the gap between observability and action in cloud-native environments. The APA system includes a distributed agent architecture that interfaces with telemetry sources, source code repositories, infrastructure-as-code (IaC) configurations, and runtime environments. In some embodiments, APA autonomously detects performance anomalies, generates optimization hypotheses, and executes corrective actions via sandboxed environments, thereby minimizing downtime, reducing operational overhead, and improving system efficiency. In another embodiment, APA formulates proposed changes as merge or pull requests, enabling human-in-the-loop review before changes are applied to production environments.

In some embodiments, the APA system is configured to function entirely within each entity's infrastructure boundary, thereby preserving intellectual property (IP) integrity. The APA system leverages dynamic AI model routing and large language model (LLM) deployment, facilitated through a GPU-aware orchestration layer known as the AI Enabler. This ensures that sensitive application data does not leave the entity environment, while still enabling advanced machine learning-driven automation.

As such, the APA system serves as a unified automation layer capable of performing real-time code analysis, infrastructure optimization, anomaly detection, security remediation, and resource efficiency governance—transforming manual and highly technical workflows into a closed-loop automation system with or without human interventions.

Additional details about the APA system are further described below with respect to FIGS. 1-20.

System Architecture

Figure 1:
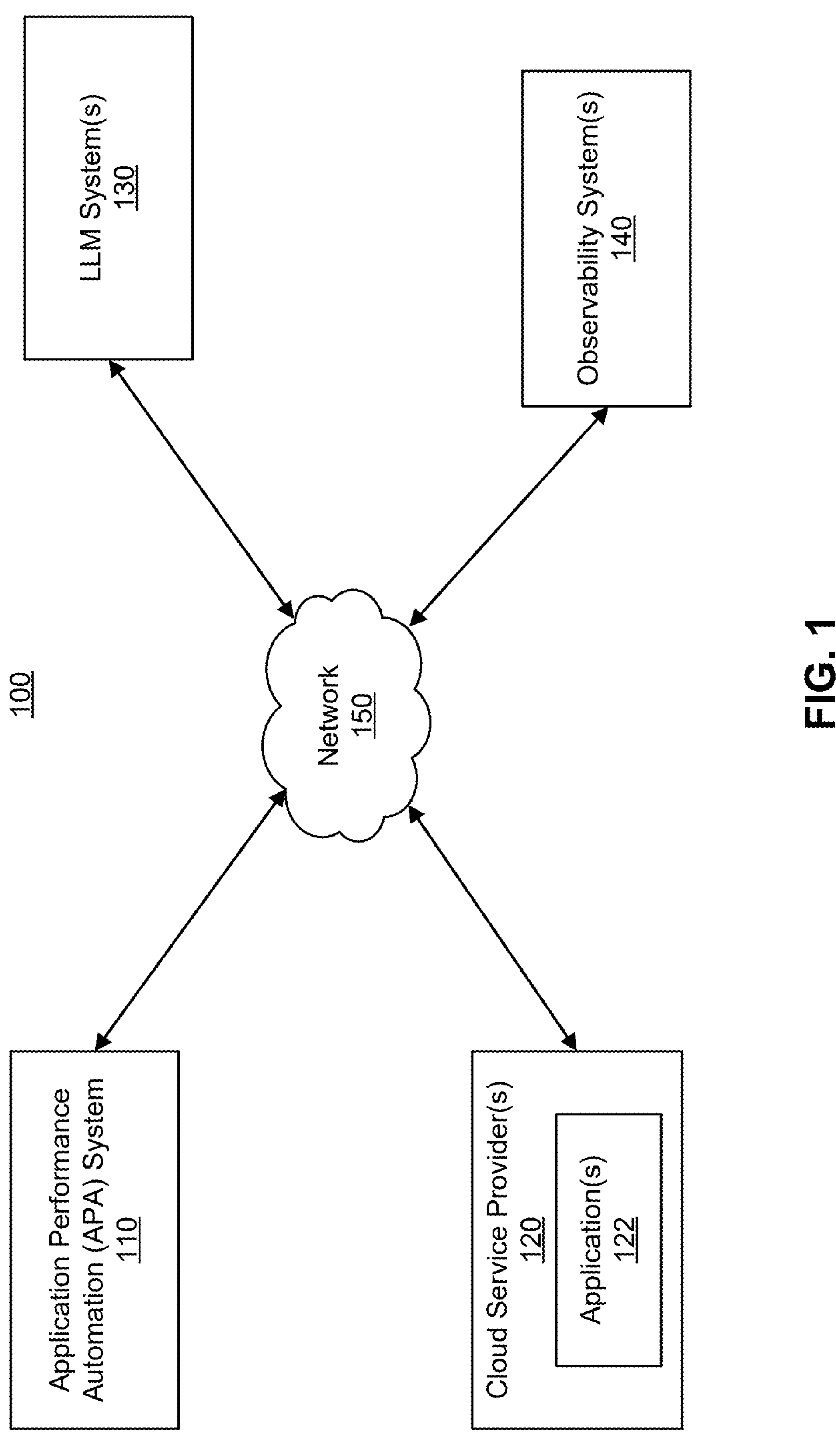
FIG. 1 is a block diagram of a system environment in which an application performance automation (APA) system may be implemented in accordance with one or more embodiments.

FIG. 1 is a block diagram of a system environment 100 in which an application performance automation (APA) system 110 may be implemented in accordance with one or more embodiments. The environment 100 includes the APA system 110, one or more cloud service providers (CSPs) 120, one or more LLMs 130, and one or more observability systems 140. The one or more CSPs host one or more applications 122. In alternative configurations, different and/or additional components may be included in the environment 100. In some embodiments, a task may be performed by a different component or a combination of multiple components.

The APA system 110 operates in accordance with a set of principles configured to improve performance efficacy, ensure data security, and facilitate human-guided automation within distributed computing environments. These principles include (1) observability as an enabling input, not an end goal, (2) incremental adoption through workflow integration, (3) data sovereignty and in-cluster execution, (4) agent-oriented architecture for proactive automation, and/or (5) human-in-the-loop change control, each of which is described in further details below.

Regarding the principle of observability as an enabling input, the APA system 110 is configured to ingest observability data, including logs, metrics, and traces, from one or more external monitoring platforms (e.g., DataDog™, New Relic™, Dynatrace™, OpenTelemetry™-compliant tools).

This observability data is used not solely for visualization or alerting purposes, but as an input to a reasoning engine that interprets system behavior and initiates corrective or optimization actions.

Regarding the principle of incremental adoption through workflow integration, the system is configured to integrate with an entity's existing toolchain without requiring wholesale replacement of existing observability or DevOps infrastructure. The system may be initially deployed to perform a limited subset of automation functions (e.g., scaling or cost recommendations), and then expanded over time to perform more complex tasks such as infrastructure-as-code (IaC) modification or source code optimization. This incremental adoption model provides immediate value while minimizing operational disruption.

Regarding the principle of data sovereignty and in-cluster execution, to preserve confidentiality and comply with organizational security policies, the system is capable of performing all data analysis, decision-making, and code transformation tasks within the boundaries of the entity's Kubernetes™ cluster. In one embodiment, the system provisions ephemeral sandbox environments to execute builds, run tests, and validate changes. At no time does the system transmit entity source code or infrastructure configuration files (e.g., Helm charts, Terraform™ scripts) outside the entity's network perimeter.

Regarding the principle of agent-oriented architecture for proactive automation, the APA system 110 includes a plurality of autonomous software agents deployed within the entity environment. Each agent is configured to perform specialized tasks such as anomaly detection, resource optimization, configuration validation, or security enforcement. These agents operate cooperatively to continuously monitor telemetry data, evaluate optimization opportunities, and execute or propose actions that enhance application performance, security posture, and infrastructure efficiency.

Regarding the human-in-the-loop change control, to ensure transparency and maintain human oversight over critical application changes, the APA system 110 is configured to generate change proposals in the form of pull requests or merge requests (PRs/MRs) against source code repositories or IaC files. These proposals include supporting evidence such as performance metrics, logs, and test results. Human reviewers may accept, reject, or annotate the proposed changes, enabling an iterative feedback loop between the automation system and engineering personnel.

The observability system 140 continuously collects telemetry data, such as logs, metrics, and traces, from applications 122 and their supporting infrastructure, e.g., Kubernetes™ clusters. Logs are time-stamped records of discrete events that occur within an application or its underlying infrastructure. These events may include errors, warnings, status updates, user actions, or system outputs generated during execution. Logs often include contextual metadata such as container ID, host name, service name, or request ID, which facilitates filtering and correlation across distributed systems. Metrics are numerical measurements collected at regular intervals that reflect the performance and behavior of software systems. Examples include CPU utilization, memory consumption, request rates, latency percentiles (e.g., p 50, p 95), and error rates. Traces represent the end-to-end flow of a single request or transaction as it propagates through a distributed system, typically across multiple microservices. A trace is composed of one or more spans, each of which records a segment of the request's lifecycle (e.g., a function call, database query, or external API (application programming interface) request). Spans include timing information and contextual identifiers that allow the reconstruction of the request path.

The APA system 110 accesses the telemetry data collected by the observability system 140 and analyzes the telemetry data to detect patterns indicative of performance degradation, resource inefficiencies or reliability risks. Based on this analysis, the APA system 110 may generate one or more hypotheses regarding potential improvements, such as adjusting resource allocations, modifying configuration parameters, or refactoring code.

In some embodiments, the APA system 110 is configured to apply one or more machine learning models to the telemetry data to detect patterns. In some embodiments, the APA system 110 has access to one or more large language models (LLMs) 130, and prompts the LLMs 130 to analyze telemetry data and reason about potential root causes of performance issues. In some embodiments, the APA system 110 is configured to obtain context about a target application by aggregating metadata associated with the application. The APA system 110 can then construct prompts for LLMs 130 by injecting relevant context from a target application or infrastructure. This ensures that the LLM 130 can reason about and act on real-world conditions related to the target application.

In some embodiments, the APA system 110 leverages the LLMs 130 to form hypotheses about improvements, such as adjusting configurations, optimizing node templates, or rewriting inefficient code. In some embodiments, the APA system 110 tests the LLM generated code or changes to existing code in a sandbox environment before being submitted as pull requests for user approval. In some embodiments, an LLM 130 is implemented as a separate system, and the APA system 110 accesses the LLM 130 via one or more APIs. Alternatively, or in addition, an LLM 130 may be deployed within the APA system 110 as part of its internal architecture, enabling local execution and tighter integration with other modules of the APA system 110.

In some embodiments, after users review the pull requests, a user may provide feedback in natural language. The APA system 110 transmits this feedback to the one or more LLMs 130 for processing, enabling the APA system 110 to infer user preferences and refine subsequent actions. Over time, this feedback-driven adjustment improves the accuracy and effectiveness of the APA system 110.

In some embodiments, the APA system 110 includes multiple agents (e.g., reasoning agent, planning agent, execution agent), and these agents are powered by LLMs 130 to carry out different phases of automation—from diagnosis to implementation. In some embodiments, when the APA system 110 lacks specific information, the LLM 130 determines which action is to be performed to obtain such information, e.g., retrieving documentation, reading a file, querying a cluster. As such, the APA system 110 is able to automatically bridge knowledge gaps and act contextually.

In some embodiments, the APA system 110 is configured to dynamically select the most appropriate LLM 130 for a given task. For example, smaller models may be selected for lightweight tasks, while larger models may be used for tasks requiring complex reasoning. The task may originate from the APA system 110 itself, such as analyzing and optimizing application performance, or it may originate from any application that is being optimized by the APA system 110.

In some embodiments, the APA system 110 is also configured to analyze metrics data associated with cloud service providers (CSPs) and to provision hardware resources for applications based on the results of that analysis. The metrics data associated with CSPs may include (but is not limited to) information such as resource availability, utilization, pricing, and latency, enabling the APA system 110 to make informed provisioning decisions that optimize performance, cost efficiency, and reliability. Further information regarding the collection of metric data associated with cloud service providers (CSPs) and the availability of compute instances can be found in U.S. patent application Ser. No. 19/079,273, filed on Mar. 15, 2024, the disclosure of which is hereby incorporated by reference in its entirety.

In some embodiments, the APA system 110 is configured to provision GPU instances for applications to deploy AI models, including LLMs. The APA system 110 may receive, at a first node located in a first availability zone (AZ), a request to deploy one or more LLMs. In response to the request, the APA system 110 determines an amount of GPU resources required to operate the one or more LLMs. The APA system 110 analyzes metrics data associated with a plurality of AZs that offer GPU resources, wherein the telemetry data includes metrics such as current utilization rates, pricing, availability, and latency characteristics of the GPU resources in each of the plurality of AZs. Based on this analysis, the APA system 110 selects one or more second AZs from the plurality of AZs according to the GPU resource metrics. The APA system 110 then provisions one or more second nodes with the requisite GPU resources in the selected AZs and deploys the one or more LLMs onto the provisioned nodes, thereby enabling execution of the LLMs on GPUs in the selected second AZs. The dynamic provisioning mechanism improves system scalability and reliability by avoiding resource bottlenecks in overloaded AZs, reduces latency by choosing AZs with favorable performance characteristics, and enhances fault tolerance by enabling cross-AZ or multi-cloud deployments.

Additional details about the APA system 110 are further described below with respect to FIGS. 2-20.

Figure 2:
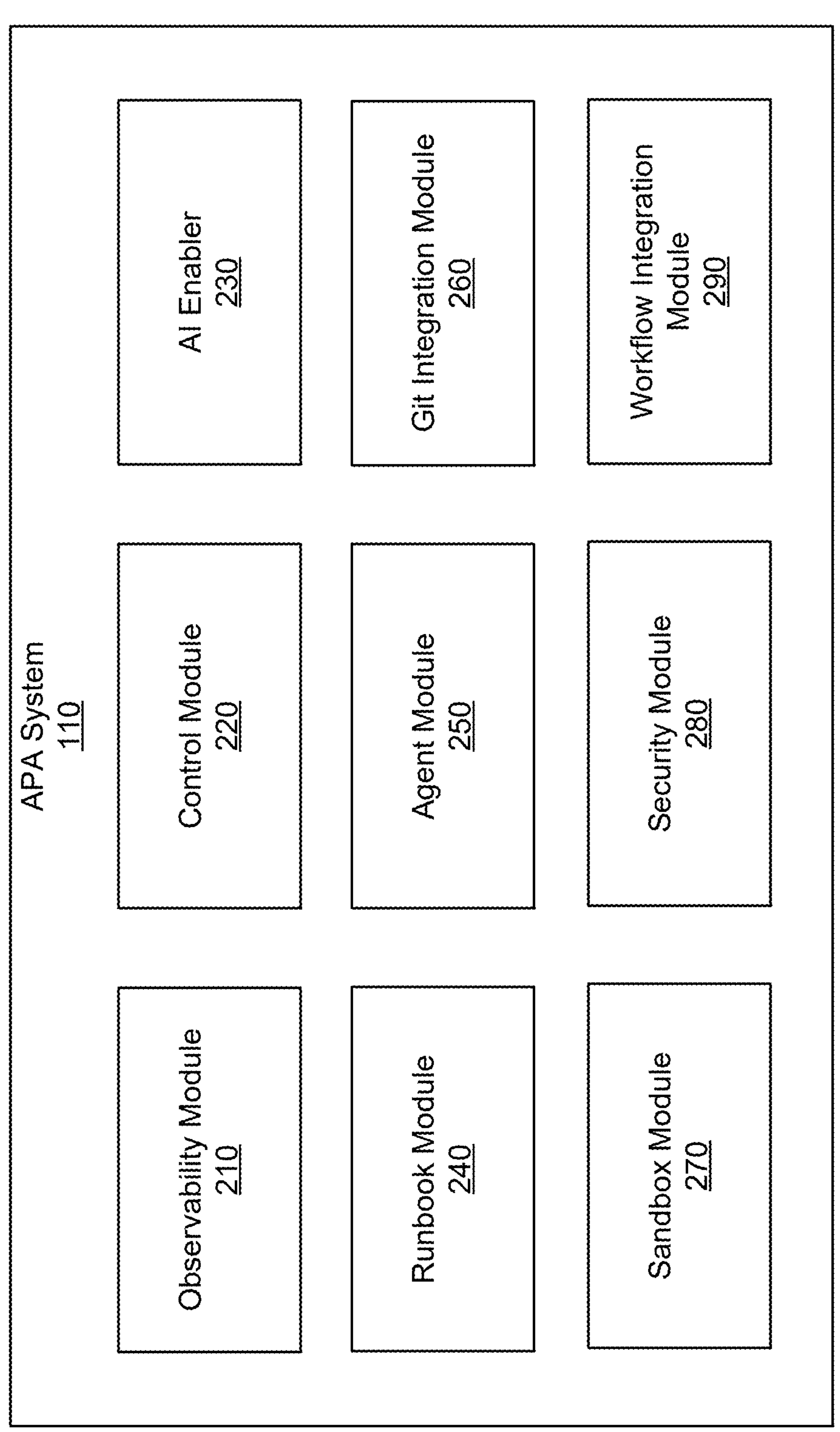
FIG. 2 is a block diagram of an example architecture of the APA system in accordance with one or more embodiments.

FIG. 2 is a block diagram of an example architecture of the APA system 110 in accordance with one or more embodiments. The APA system 110 includes an observability module 210, a control module 220, an AI enabler 230, a runbook module 240, an agent module 250, a git integration module 260, sandbox module 270, a security module 280, and a workflow integration module 290.

The observability module 210 is configured to interface with external telemetry platforms and collect operational data from distributed applications and infrastructure. The observability module 210 may integrate with third-party monitoring tools, including but not limited to DataDog™, New Relic™, Dynatrace™, or any OpenTelemetry™-compliant system, to ingest logs, metrics, traces, and events. In some embodiments, the observability module 210 normalizes and enriches the collected data to form a unified dataset that serves as the basis for performance analysis, anomaly detection, and optimization hypothesis generation. In some embodiments, the observability module 210 operates passively by consuming existing telemetry streams, while in other cases, it may deploy lightweight agents to extract low-level runtime signals directly from containers or Kubernetes™ resources. The observability module 210 enables the APA system 110 to maintain real-time awareness of application behavior and infrastructure state, facilitating informed decision-making by downstream modules such as the control module 220 and agent module 250. Additionally, the observability module 210 may store or forward time-series data to support rollback validation, regression detection, and post-execution impact analysis.

The control module 220 serves as a centralized orchestration and policy management component within the APA architecture. In some embodiments, the control module 220 is configured to coordinate the execution of automation workflows across one or more customer-managed Kubernetes™ clusters by interfacing with distributed APA agents in the agent module 250. In some embodiments, the control module 220 maintains a repository of runbook definitions, policy rules, optimization patterns, and historical telemetry data. The control module 220 communicates directives to in-cluster components for secure, localized execution. In some embodiments, the control module 220 enforces global policies such as workload placement strategies, compliance requirements, and cost optimization thresholds. The control module 220 may also aggregate anonymized telemetry from participating clusters to refine performance models, update runbook logic, and recommend best practices. The control module 220 ensures consistent behavior across environments and acts as the long-term memory of the system, preserving audit logs, configuration changes, and optimization outcomes for traceability and reuse.

The AI enabler 230 is configured to facilitate access to external or in-cluster artificial intelligence (AI) and machine learning (ML) models used for reasoning, inference, and decision support. The AI enabler 230 operates as a dynamic routing and execution layer that bridges agent module 250 and sandbox module 280 with one or more AI model providers. In some embodiments, the AI enabler 230 may transmit requests to external large language model (LLM) services such as OpenAI™ or Claude™. In other embodiments—particularly where data locality or privacy is a concern—the AI enabler 230 may deploy and invoke open-source models (e.g., LLaMA™ or similar transformer-based architectures) directly within the customer's Kubernetes™ cluster. In some embodiments, the AI enabler 230 includes a model selection framework configured to determine the appropriate model and inference strategy based on task complexity, execution context, and data sensitivity. For example, lightweight models may be used for routine task planning, while more advanced models may be invoked for code refactoring or optimization analysis. The AI enabler 230 ensures that reasoning tasks are executed securely and efficiently, supporting APA's automation goals without compromising data control or operational integrity.

The runbook module 240 is configured to manage the definition, execution, and tracking of automation workflows within the APA system 110. In some embodiments, the runbook module 240 provides a declarative interface through which users may select and initiate pre-configured or custom runbooks targeting specific objectives such as microservice performance tuning, infrastructure cost optimization, database query acceleration, or security posture remediation. Each runbook defines a structured, multi-phase process that may include data collection, hypothesis generation, sandbox testing, and validation. The runbook module 240 coordinates the execution of these phases across distributed components—such as the agent module 250, sandbox module 270, and AI enabler 230—while maintaining state awareness and progress indicators. In some embodiments, the runbook module 240 also interfaces with CI/CD systems, observability module 210, and git integration module 260 to collect required inputs and validate proposed changes. In some embodiments, the runbook module 240 may also support human-in-the-loop workflows by generating pull requests, issue tickets, or approval gates at configurable checkpoints. The runbook module 240 enables consistent, repeatable execution of complex automation logic, while ensuring traceability, auditability, and compliance with user-defined policies.

The agent module 250 is configured to operate as an in-cluster execution coordinator for the APA system 110. The agent module 250 is deployed within customer-managed Kubernetes™ environments and is responsible for orchestrating task execution based on instructions received from the control module. The agent module 250 may interpret runbook logic into discrete operational steps, such as provisioning sandbox environments, initiating application profiling, collecting telemetry data, or applying infrastructure changes. In some embodiments, the agent module 250 interfaces with observability module 210 to ingest logs, metrics, and traces, and coordinates with the AI enabler 230 for model-based reasoning tasks. In some embodiments, the agent module 250 also interface with git integration module 260 to retrieve source code, Helm charts, and infrastructure-as-code (IaC) artifacts from customer Git repositories using secure, ephemeral credentials. In some embodiments, the agent module 250 may also communicate with the sandbox module 270 through lightweight messaging protocols to delegate execution of build, test, and refactor tasks. In some embodiments, the agent module 250 continuously monitors execution state, handles error conditions, and supports rollback operations when necessary. By localizing control within the customer environment, the agent module 250 enables real-time automation while maintaining data privacy and operational isolation.

The git integration module 260 is configured to interface with one or more version control systems used by the customer, such as GitHub™, GitLab™, Bitbucket™, or other Git-compliant platforms. The git integration module 260 enables the APA system 110 to interact with application source code, infrastructure-as-code (IaC) artifacts, Helm charts, and deployment manifests stored in Git repositories. In some embodiments, the git integration module 260 facilitates secure, read-only access for code analysis, as well as write operations for generating pull requests (PRs) that contain proposed optimizations or remediations. In some embodiments, interactions with Git repositories are routed through the agent module 250 and sandbox module 270, ensuring that credentials and access tokens remain confined to the customer's infrastructure. The git integration module 260 supports DevOps workflows by aligning automation actions with version-controlled change histories, enabling transparency, traceability, and compliance with enterprise change management practices. Additionally, the git integration module 260 may annotate commits or PRs with metadata such as security patch identifiers, performance improvement metrics, or links to corresponding issue tickets, thereby enhancing visibility and auditability across the DevOps lifecycle.

The sandbox module 270 is configured to provision and manage isolated execution environments (also referred to as sandboxes) within the customer's Kubernetes™ cluster. The sandbox module 270 enables secure experimentation, validation, and testing of proposed application or infrastructure changes without impacting production workloads. In some embodiments, each sandbox is instantiated as an ephemeral Kubernetes™ pod or group of pods, configured to replicate the production environment while maintaining strict isolation boundaries. The sandbox module 270 executes tasks such as compiling source code, running unit and integration tests, simulating performance tuning hypotheses (e.g., function refactoring, caching strategies), and validating configuration changes. In some embodiments, the sandbox module 270 is capable of scaling horizontally to support parallel evaluation of multiple optimization paths across microservices or infrastructure components. In some embodiments, the sandbox module 270 operates under the orchestration of the agent module and may interface with the AI enabler 230 for reasoning tasks. In some embodiments, all code analysis and execution within the sandbox module 270 occurs entirely within the customer's infrastructure, ensuring that sensitive data remains protected. In some embodiments, in response to task completion, the sandbox may be automatically decommissioned to free up resources and maintain a minimal security footprint.

The security module 280 is configured to detect, analyze, and remediate security risks across containerized applications and Kubernetes™ infrastructure. The security module 280 integrates with Kubernetes™ Security Posture Management (KSPM) capabilities and leverages in-cluster agents, such as Kvisor, to continuously monitor for vulnerabilities, misconfigurations, and policy violations. In some embodiments, the security module 280 inspects container images, deployment manifests, and runtime environments to identify issues such as exposed secrets, missing security contexts, excessive permissions, and known CVEs (Common Vulnerabilities and Exposures). In some embodiments, the security module 280 prioritizes findings based on attack path analysis, focusing on vulnerabilities that are exposed to external traffic or that exist in critical workload paths. In response to identifying actionable issues, the security module 280 can generate remediation proposals in the form of annotated pull requests or issue tickets, routed through the git integration module and ticketing systems. In some embodiments, the security module 280 also supports compliance benchmarking against standards such as the CIS™ (Center for Internet Security) Kubernetes™ Benchmark. In some embodiments, all security-related analysis and remediation activities are performed within the customer's infrastructure, preserving data sovereignty while enabling continuous security posture improvement.

The workflow integration module 290 is configured to interface with external tools and systems commonly used in DevOps and Site Reliability Engineering (SRE) environments. The workflow integration module 290 enables coordination between the APA system 110 and third-party platforms such as CI/CD pipelines (e.g., GitHub™ Actions, GitLab™ CI, CircleCI™), ticketing and incident management systems (e.g., JIRA™, PagerDuty™, Opsgenie™), and infrastructure-as-code frameworks (e.g., Terraform™, Helm™, Pulumi™). In some embodiments, the workflow integration module 290 facilitates the bi-directional flow of automation tasks and status updates, allowing APA-generated changes—such as pull requests, configuration updates, or remediation actions—to be embedded into existing operational workflows. In some embodiments, the workflow integration module 290 is configured to automatically create, update, and track issue tickets related to performance optimizations, security fixes, or configuration drift. It may also monitor the progress of CI/CD jobs triggered by APA interventions and report success or failure conditions back to the control module 220 or runbook module 240. By embedding automation into established workflows, the workflow integration module 290 ensures that APA system 110 complements human-driven engineering processes while maintaining traceability and auditability across the software delivery lifecycle.

Figure 3:
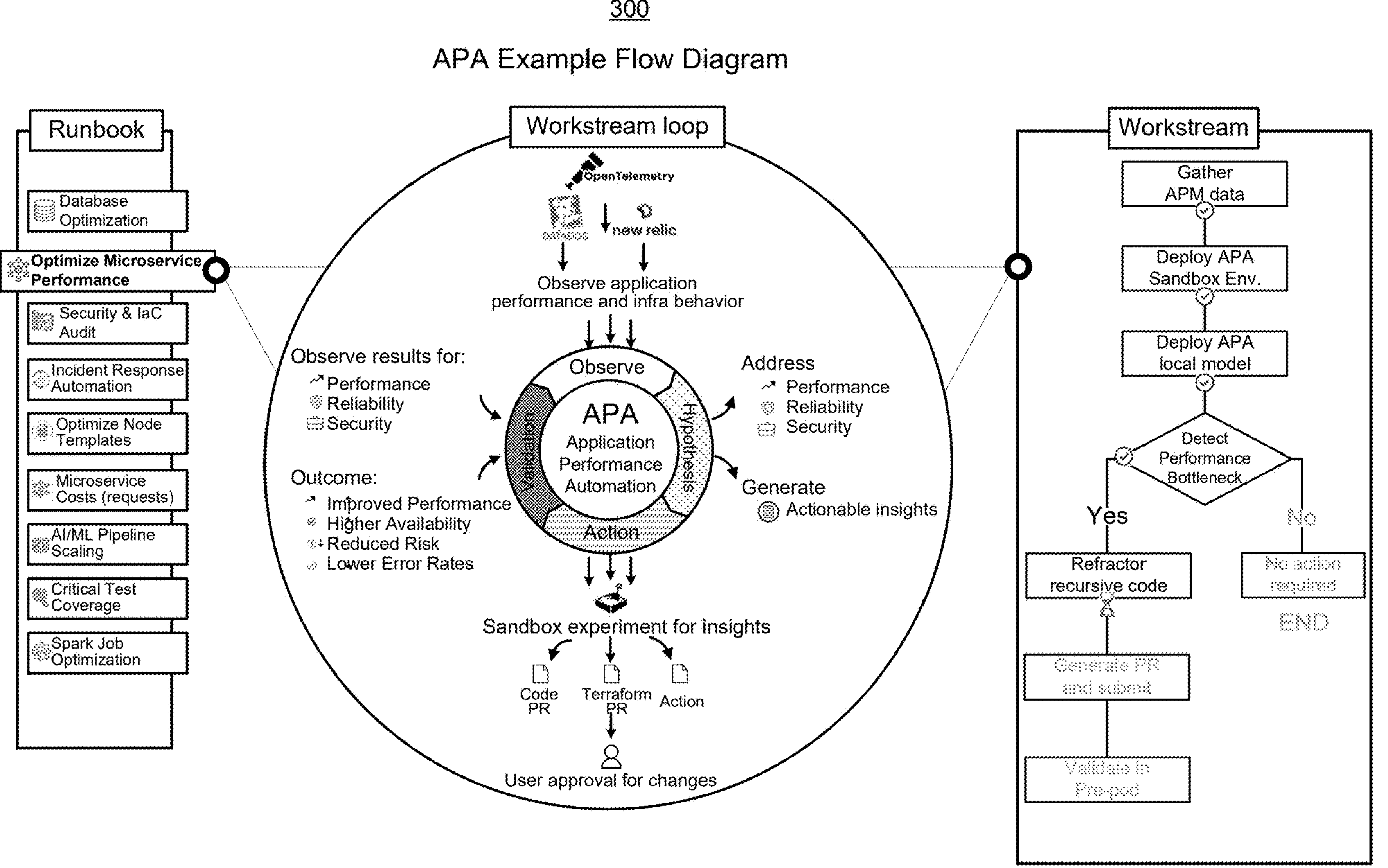
FIG. 3 is an example diagram that illustrates an operational flow of the APA system in accordance with one or more embodiments.

FIG. 3 is an example diagram 300 that illustrates an operational flow of the APA system 110 in accordance with one or more embodiments. The diagram includes three sections, a runbook section 310, an APA workstream loop section 320, and a workstream execution path section 330. The runbook section 310 lists multiple runbooks, such as database performance optimization, database microservice optimization, security IaC (infrastructure-as-code) audit, optimize cloud resource, critical test coverage, auto-scaling tuning, AI/ML pipeline scaling, spork job optimization, among others. In the APA system 110, a runbook is a modular automation workflow that defines what needs to be done to achieve a goal or intent. Each runbook includes a structured, repeatable set of instructions or actions configured to perform a specific operational task or respond to a specific scenario.

The database performance optimization runbook may be configured to detect high-resource consumption queries or unindexed columns. In response to detecting high-resource consumption queries, the runbook may recommend or apply caching strategies, refactor query structures, or recommend schema changes or resource scaling.

The database microservice optimization runbook may be configured to profile microservice latency and identifies database-related bottlenecks. In response to identifying database-related bottlenecks, the runbook may recommend query batching or pagination, refactors inefficient code (e.g., recursive calls), and enable database-aware workload optimization.

The IaC audit runbook may be configured to analyze Kubernetes™ manifests, helm charts, dockerfiles, and terraform™ for misconfigurations (e.g., privilege escalation, missing security contexts), vulnerable base images or open ports, secrets exposed in environment variables, and/or violations of security benchmarks.

The optimize cloud resources runbook may be configured to improve cloud resource efficiency by rightsizing compute/memory for workloads, consolidating or rebalancing resources across nodes, AZs, or regions, and/or switching to cost-efficient instance types (e.g., from n1 to n2d in GCP).

The critical test coverage runbook may be configured to identify and remediate gaps in automated testing for high-priority services or application components. In some embodiments, the critical test coverage runbook may analyze application architecture (via codebase, telemetry, or annotations) to detect high-impact services or functions-such as payment processing, authentication, or data validation. The critical test coverage may also use historical incident data, call graph analysis, or labels (e.g., critical=true) to prioritize components. In some embodiments, the critical test coverage runbook may also review source code repositories (via Git access) to locate unit tests, integration tests, and/or end-to-end (E2E) tests, and correlate test files with application logic using file paths, import trees, or naming conventions.

In some embodiments, the critical test coverage runbook may also compute, line, branch, and/or function coverage, test density per module or function and highlight untested or lightly tested critical areas. In some embodiments, the critical test coverage runbook may also propose new tests. In response to determining that critical logic lacks sufficient coverage, the APA system (via LLMs) may generate test stubs or templates, full test cases with assertions, mocks, and fixtures, and/or pull requests containing these additions for review. In some embodiments, the critical test coverage runbook may also run proposed tests in the APA sandbox and check test success/failure, runtime performance impact, and changes to test coverage metrics.

The auto-scaling tuning runbook may be configured to analyze workload metrics to fine-tune horizontal pod autoscaler (HPA) or cluster autoscaler configurations. In some embodiments, the auto-scaling tuning runbook may adjust scaling thresholds (e.g., CPU/memory thresholds), set appropriate min/max replica counts, and enable predictive scaling for known patterns.

The AI/ML pipeline scaling runbook may be configured to target GPU-backed workloads such as model training or inference. In some embodiments, the AI/ML pipeline scaling runbook may profile GPU usage across jobs or pipelines, scale AI/ML workloads dynamically (e.g., based on job queue depth or input size), and select optimal node types and AZs using the AZ selection module.

The spark job optimization runbook may be configured to improve performance and cost of distributed spark jobs by analyzing executor memory and CPU usage, and/or reconfiguring resource allocation (e.g., executor cores, shuffle partitions). In some embodiments, the spark job optimization runbook may also recommend optimal instance types (e.g., spot vs. on-demand), and identify long-running or inefficient jobs.

The APA work stream loop section 320 includes steps that APA system 110 performs in a loop, namely observe, hypothesize, action, and validation. The APA system 110 observes the application and infrastructure telemetry via observability platforms, such as Datadog™ and New Relic™, OpenTelemetry™, among others. Based on the monitored telemetry, the APA system 110 forms hypotheses about potential issues or improvements (e.g., performance bottlenecks, inefficient code). The APA system 110 can then run sandbox experiments using cloned environments to safely test hypotheses. Based on the findings, the APA system 110 can generate code PRs (e.g., refactored functions), terraform™ PRs (e.g. updated resource configs), and/or submit changes for user approval. The APA system 110 may also validate changes through test results and impact analysis.

The workstream execution path section 330 shows a decision-making flow within the workstream, corresponding to the runbook being executed and the APA workstream loop. First, the APA system 110 collects telemetry, and deploys a sandbox environment. In some embodiments, the APA system 110 may also deploy APA local mode that runs analysis without cloud dependency. The APA system 110 can then detect performance bottleneck. In response to detecting performance bottleneck, the APA system 110 applies code transformation (e.g., refactor recursive code), then generate a pull request (PR) and submit, and validate in pre-production. Otherwise, no performance bottleneck is present, and no action is required.

As illustrated in FIG. 3, the optimize microservice performance runbook is being selected. In some embodiments, a user may select a runbook through a runbook library. For example, a user may notice latency issues in a service, opens APA's dashboard, and selects the optimize microservice performance runbook to begin targeted analysis.

Alternatively, the APA system 110 selects the runbook automatically based on detected conditions in the environment. For example, the APA system 110 may observe that a particular API is experiencing elevated latency and high database call durations. The APA system 110 may match this pattern to the optimize microservice performance runbook, and automatically triggers the runbook to begin diagnosis and propose a fix (e.g., caching, query batching, code refactoring). As such, the APA system 110 is able to support self-healing and proactive remediation.

Figure 4:
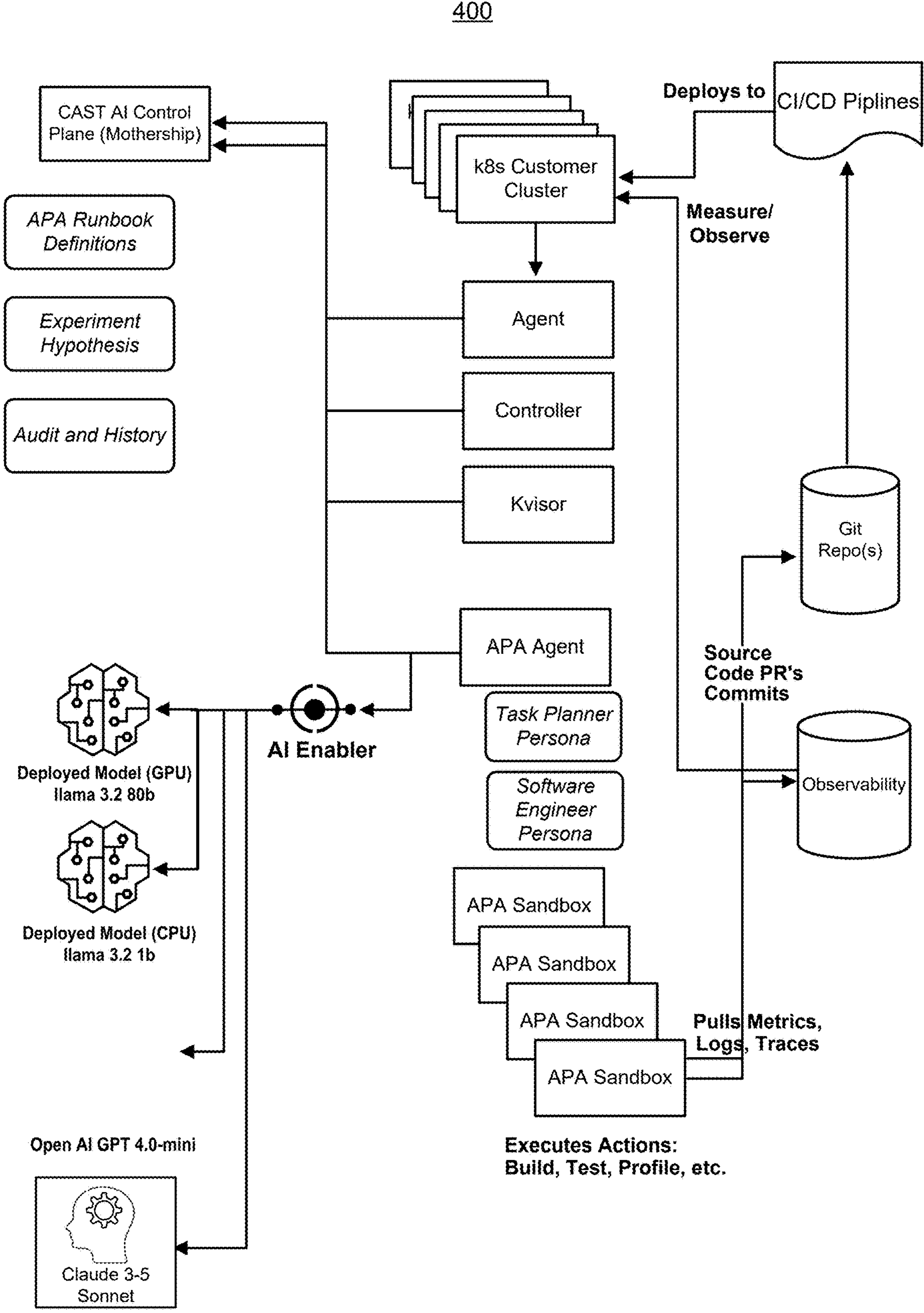
FIG. 4 illustrates an example architecture integrated into a customer-managed cloud environment, in accordance with one or more embodiments.

As described above, in some embodiments, the APA system 110 may be integrated into a customer-managed cloud environment. FIG. 4 illustrates an example architecture 400 integrated into a customer-managed cloud environment, in accordance with one or more embodiments. As illustrated, the APA system 110 includes a distributed, agent-based architecture designed to integrate into customer-managed cloud environments, while ensuring operational segregation, scalability, and data privacy. The architecture facilitates performance optimization, cost reduction, and security remediation across cloud-native workloads through coordinated interactions among multiple functional components.

The APA system 110 includes the APA Control Plane (also referred to as the "mothership", which may correspond to the control module 210 of FIG. 2). The APA control plane serves as the central orchestration and policy management layer. This control plane is responsible for: (1) coordinating agent behavior across all customer clusters, (2) enforcing system-wide policies, (3) allocating workloads to in-cluster agents, and (4) persisting historical data including audit logs, configuration changes, and optimization outcomes derived from prior runbook executions. Notably, the control plane is logically and operationally decoupled from customer application code and infrastructure. All code and configuration analysis is executed within isolated environments under customer control. The control plane may, however, facilitate orchestration through declarative workflows and shared metadata across APA components.

The APA system 110 is deployed directly within customer-managed Kubernetes™ clusters, including environments hosted on managed services such as Amazon EKS™, Azure AKS™, and Google GKE™. Within these clusters, APA operates as a Kubernetes™—native extension comprising runtime agents, sandbox pods, and optional inference components.

These environments serve as the primary execution layer for APA tasks, including application profiling, infrastructure modification, code transformation, and performance validation. APA sandboxes and agents are instantiated and scaled based on workload characteristics and optimization goals.

The APA agent is deployed in each customer cluster and serves as the primary execution manager and reasoning interface for runbook operations. In some embodiments, the APA agent is configured to perform one or more of the following functions: (1) task orchestration (which parses runbook definitions received from the control plane and breaks them down into discrete execution steps), (2) sandbox management (which dynamically provisions, monitors, and decommissions sandbox environments in response to task execution demands), (3) observability integration (which collects telemetry signals by interfacing with observability providers such as DataDog™, New Relic™, or Dynatrace™), (4) source code interaction (which directs sandbox pods to access customer Git repositories and retrieve relevant application and infrastructure-as-code artifacts), (5) inter-process communication (which maintains secure communication with sandboxes using lightweight messaging protocols), and (6) reasoning and decision-making (which executes AI-driven inference to evaluate telemetry data, identify performance bottlenecks, simulate remediation scenarios, and recommend optimal changes). The APA Agent enables autonomous decision-making and emulates DevOps workflows traditionally performed by human engineers.

The APA Sandbox is a transient, isolated execution environment instantiated within the customer's Kubernetes™ cluster. Each sandbox operates similarly to CI/CD pipeline runners and is optimized for (1) code compilation and testing (executing build and test sequences to evaluate performance impacts of proposed changes), (2) hypothesis execution: (trialing performance-enhancing modifications (e.g., function refactoring, caching strategies) prior to production deployment), and (3) secure execution (ensuring isolation from production workloads while preserving runtime consistency for validation tasks). Sandbox environments can scale horizontally across multiple pods to support concurrent testing across different microservices or application layers, reducing overall experimentation latency.

The APA system 110 integrates with customer-managed Git repositories to retrieve application source code, infrastructure manifests (e.g., Helm charts, Kubernetes™ YAML), and CI/CD pipeline definitions. This integration supports version-controlled automation and ensures: (1) traceability of all configuration changes, (2) consistent application of optimization strategies across development and production environments, and (3) human-in-the-loop review through pull request workflows. To preserve confidentiality, the APA Control Plane does not access Git repositories directly. Instead, sandbox environments securely interact with Git, using secrets scoped to the customer's infrastructure and managed according to industry-standard credential management practices.

Observability data enables APA's analytical reasoning. The APA system 110 integrates with industry-standard platforms (e.g., DataDog™, New Relic™, Dynatrace™) via OpenTelemetry™-compliant interfaces to ingest logs, metrics, and traces. APA uses this data to detect anomalies and performance degradation, inform hypothesis generation for optimization, and validate the impact of applied changes against key performance indicator (KPIs). In some embodiments, the observability interface is vendor-agnostic, enabling APA to operate across heterogeneous monitoring infrastructures.

To support advanced reasoning and natural language understanding tasks, APA includes an AI Enabler Proxy, which serves as a configurable gateway to external and local AI model providers. Depending on customer policy and data governance requirements, the AI Enabler can route requests to cloud-based LLMs (e.g., OpenAI™, Claude™), and/or deploy and invoke open-source models (e.g., LLaMA™) within the customer's cluster for localized inference.

The dynamic model selection mechanism enables APA to choose between lightweight models for planning tasks and more computationally intensive models for code generation, refactoring, or security analysis. In configurations where sensitive source code or infrastructure data must not leave the customer boundary, the AI Enabler ensures fully in-cluster execution of AI inference, preserving compliance with internal security policies and regulatory constraints.

In some embodiments, the AI Enabler allows the APA agents to use LLMs to perform certain tasks, such as analyzing and improving software code, modifying deployment configurations, reasoning through observability data, identifying and fixing security issues, among others. In some embodiments, the AI enabler automatically selects one of the LLMs to perform an action for an APA agent. As illustrated, the LLMs include deployed models (e.g., various LLaMA™models) and SaaS models (e.g., Open AI™ GPT 4.0-mini and Claude™ 3.5 Sonnet). The deployed models may include larger models deployed on GPUs (e.g., LLaMA™ 3.2 80 b) and smaller models deployed on CPUs (e.g., LLaMA™ 3.2 lb). The decision on which model to use for which task may be based on resource-efficient reasoning vs. heavy-duty refactoring.

For example, when performing lightweight reasoning tasks such as summarizing log files, parsing error messages, or generating configuration parameter recommendations, the APA system 110 may select a smaller, CPU-deployed model such as LLaMA™ 3.2 lb to reduce latency and computational cost. In contrast, for complex tasks like generating multi-step Terraform™ refactoring, rewriting recursive application code into iterative form, or analyzing the interplay between multiple microservices in a distributed trace, the APA system 110 may invoke a larger, GPU-backed model such as LLaMA™ 3.2 80b to ensure deeper context understanding and higher reasoning accuracy.

In some embodiments, the APA system 110 may also invoke SaaS-hosted LLMs such as OpenAI™ GPT-4.0-mini for tasks that benefit from high language fluency with moderate context depth, like composing explanatory pull request messages. For more nuanced security-related refactoring or dependency resolution involving policy and compliance tradeoffs, the system may choose a more advanced model such as Claude™ 3.5 Sonnet to generate reasoned, auditable recommendations.

The model selection process may factor in task complexity, expected output length, latency constraints, cost per token, and whether code-level execution is required, allowing APA to optimize both performance and resource usage across heterogeneous LLM backends. Additional details regarding the dynamic selection of LLMs are described in U.S. patent application Ser. No. 18/641,001 (now issued as U.S. Pat. No. 12,236,193), which is incorporated herein by reference in its entirety.

Figure 5:
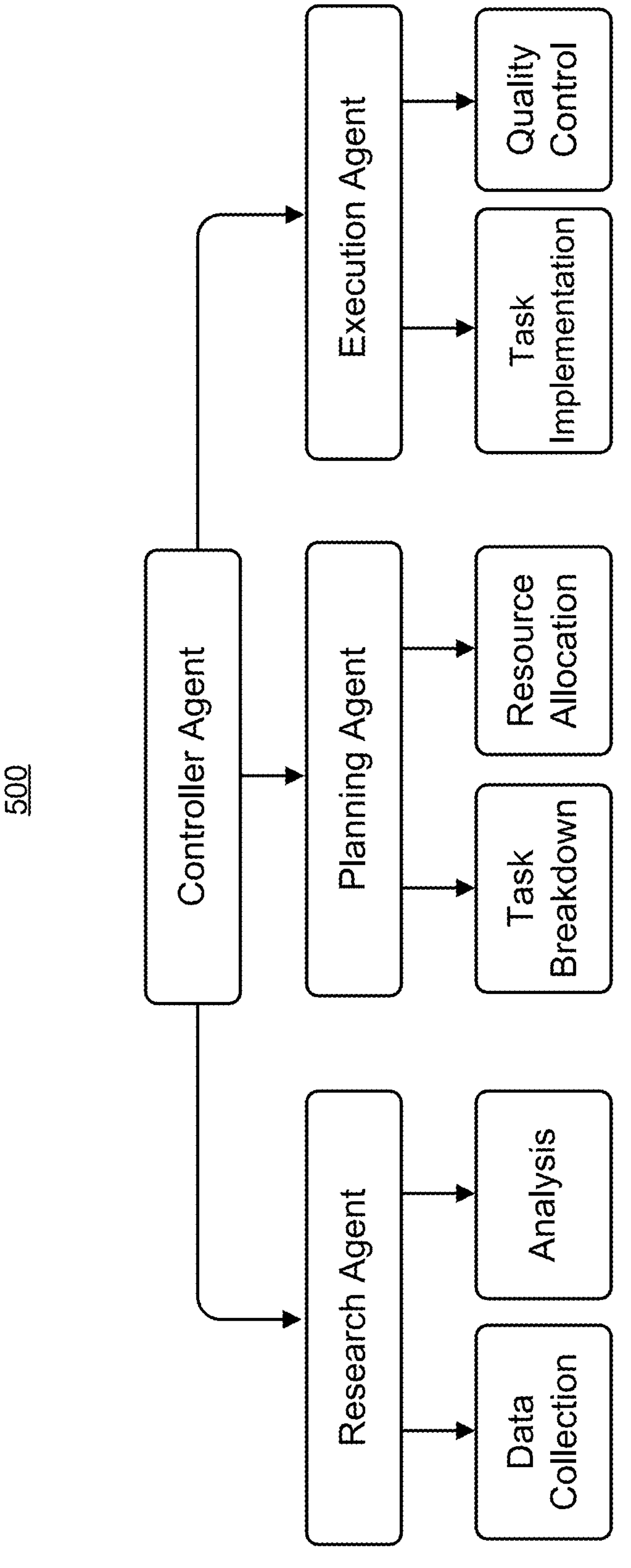
FIG. 5 illustrates an example diagram of a multi-agent sub-system that is implemented by the APA system in accordance with one or more embodiments.

In some embodiments, the APA system 110 includes multiple agents, each configured to perform a subset of tasks. FIG. 5 illustrates an example diagram of a multi-agent sub-system 500 that is implemented by the APA system 110 in accordance with one or more embodiments. The multi-agent sub-system 500 includes a controller agent, a research agent, a planning agent, and an execution agent. The controller agent oversees the research agent, planning agent, and execution agent. The research agent is configured to perform data collection and analysis. The planning agent is configured to break down tasks and allocate resources. The execution agent is configured to implement tasks and ensure quality control.

For example, when the APA system 110 detects elevated latency in a microservice, the controller agent triggers the research agent to collect telemetry data, such as traces, logs, and resource metrics. The research agent analyzes the collected data to identify potential bottlenecks—such as a slow database query or an overutilized CPU. Next, the planning agent receives the research findings and breaks down the optimization task into discrete steps, such as refactoring a recursive function, increasing CPU resource limits in a Helm chart, and/or testing alternative instance types in a sandbox. The planning agent may also allocate resources—e.g., selecting a GPU-enabled sandbox for code profiling, or assigning appropriate runbooks and tools. The execution agent may then carry out the planned steps, such as applying code transformations using LLMs, running tests and benchmarks inside APA sandbox environments, and determining that changes meet reliability and performance targets. The execution agent may also perform quality control by validating metrics before submitting pull requests for human approval.

In another example, during a security audit, the research agent may identify misconfigured infrastructure-as-code files that expose security risks (e.g., missing network policies or overly permissive network policies). The planning agent may be configured to plan a remediation strategy, and the execution agent may enforce the policy hardening changes across affected deployments, validating each fix via test runs in the sandbox.

Figure 6:
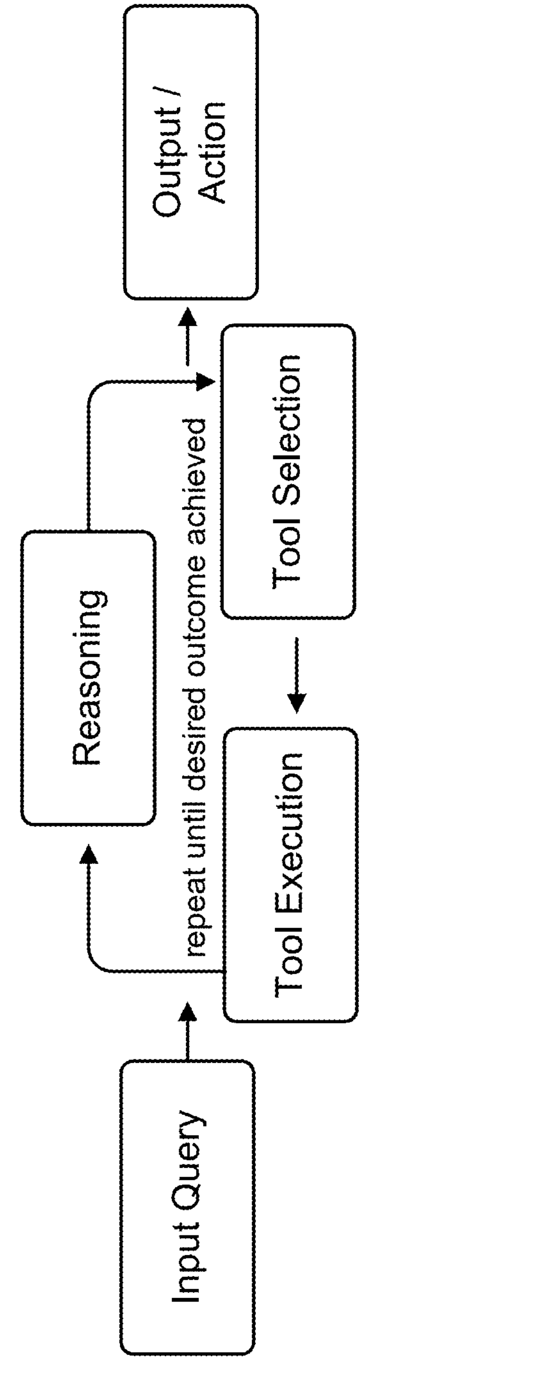
FIG. 6 illustrates an example process, in which a reasoning-and-action pattern applied by APA agents to solve complex tasks (such as runbooks) by combining planning with tool-based interactions, in accordance with one or more embodiments.

FIG. 6 illustrates an example process 600, in which a reasoning-and-action pattern applied by APA agents to solve complex tasks (such as runbooks) by combining planning with tool-based interactions, in accordance with one or more embodiments. The APA system 110 may include multiple agents described above with respect to FIG. 5. The process may start when the APA system 110 receives a task, request, or a selection of a runbook by a user or by a control agent (e.g., for the purpose of reducing latency, refactoring code, patching IaC). Another APA agent may pass the request to an LLM, which in turn interprets the query and determines how to approach it, such as identifying what information is missing or what operations are needed. Based on the reasoning, the agent chooses from available tools (e.g., log analyzers, file readers, code writers, profilers) to help solve the task. The selected tool is invoked, executing an action or retrieving data to inform the next step. After execution of an action or retrieval of data, the APA agent may present the results of the action or retrieved data to the LLM, causing the LLM to reason based on the updated context from the last tool's output. This loop continues until the desired outcome is achieved—this could be a fully formed code change, a completed test, or validated performance fix. In response to the loop concluding successfully, the APA agent produces a final result—such as a pull request, configuration file update, or validated solution.

For example, the APA Agent may "think": because X, I should read file Y, where the APA agent may use reasoning to decide that reading file Y will help solve the task. The APA agent may use the appropriate tool, such as a file-reading function, print (read file ("Y")), to act on its decision. The APA agent can then receive an observation—the result of the tool execution, e.g., content of file Y, which feeds back into the next reasoning step. The cyclical interaction between thought, action, and observation makes the APA system powerful for stepwise, traceable decision-making.

Figure 7:
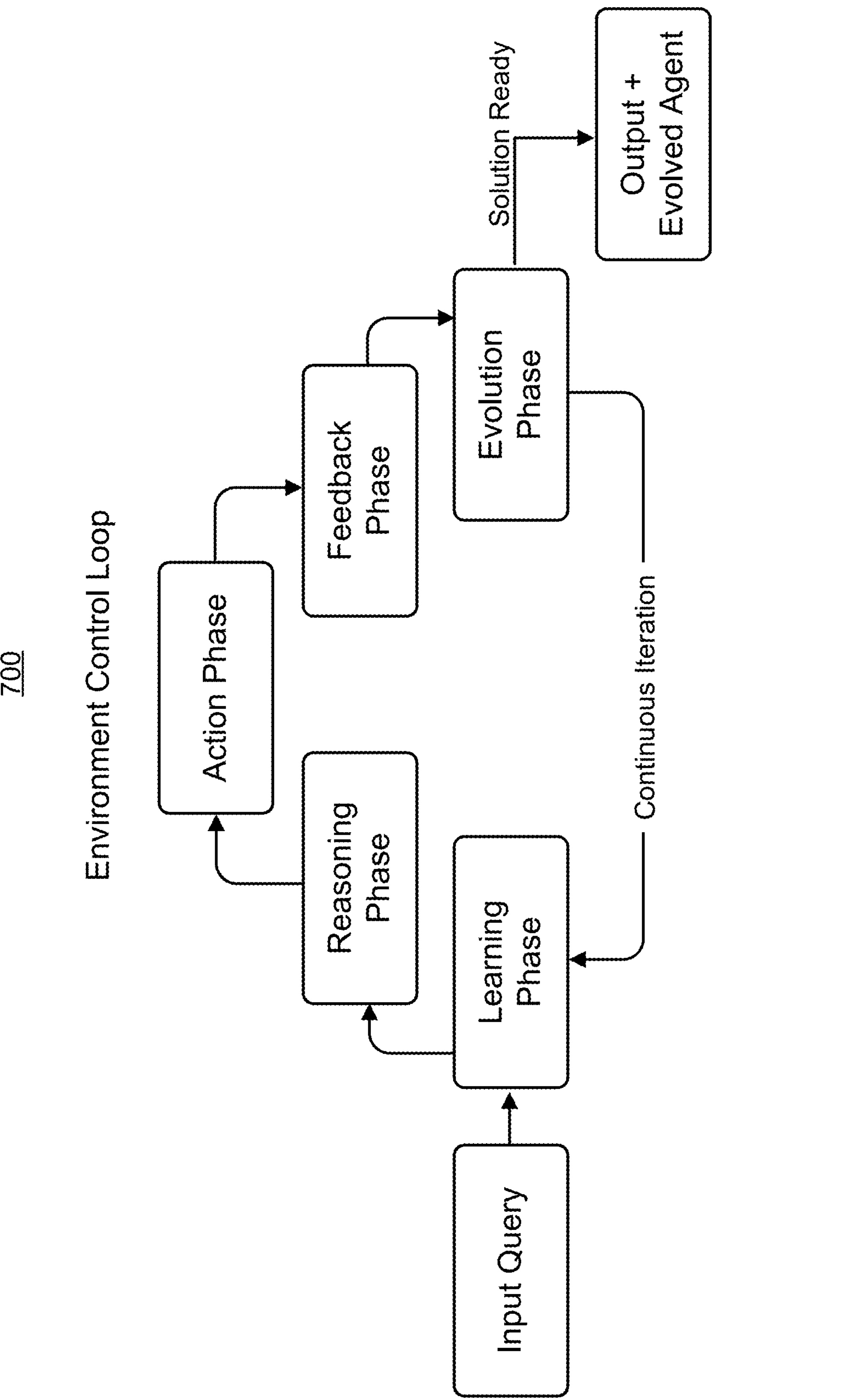
FIG. 7 illustrates an example control loop process, in which an APA agent improves over time through reasoning, acting, observing outcomes, and evolving its behavior based on feedback, in accordance with one or more embodiments.

FIG. 7 illustrates an example control loop process 700, in which an APA agent improves over time through reasoning, acting, observing outcomes, and evolving its behavior based on feedback, in accordance with one or more embodiments. Again, a task or question is received. This might be a performance issue, an optimization goal, a runbook, or any problem the APA agent is expected to solve. The APA agent collects initial information, such as telemetry, code context, configuration files, or prior outcomes, which sets the foundation for informed reasoning. The APA agent may prompt an LLM to interpret the query and the learned context to form a hypothesis or plan, including (but not limited to) selecting tools, strategies, or sub-tasks to execute. The APA agent then executes its planned actions, which may include (but are not limited to) prompt an LLM to write code, applying a configuration change in a sandbox, or running a performance test. The APA agent may then collect real-world signals (e.g., logs, metrics, test results, human review feedback) to assess the success or failure of the action taken. Based on the feedback, the agent updates its internal model or strategy—learning from what worked and what didn't, enabling long-term adaptability. In response to the result meeting the success criteria, the loop ends with a final output, e.g., fix, optimization, or validated action, and/or an evolved agent, which has now learned from the interaction and improved for future tasks. In response to the solution being not ready or insufficient, the process loops back to the learning phase, now with more context from prior attempts.

For example, the APA agent may receive an input query, "the checkout-api service is experiencing latency spikes above 1.5 s in 95$^{th}$ percentile response times." In response to the input query, the APA agent collects relevant telemetry, such as recent logs, traces, and metrics from the service, resource allocation (CPU/memory) from Kubernetes™ deployment, deployment configs from the Git repository, historical PRs or incidents for the same service, among others. The APA agent may prompt an LLM to form a hypothesis based on the collected telemetry. The hypothesis may be "the latency may be caused by a recursive function in the payment handler that's inefficient under load."

In response to the hypothesis, the APA agent may then prompt an LLM to refactor the recursive function into an iterative version using LLMs, runs the updated code in an APA sandbox environment, and executes integration and performance tests. After sandbox testing, the APA agent may observe latency improved from 1.5 s to 900 ms in test cases, no failed unit or integration tests, and/or resource usage decreased by 25%. In response to the newly observed telemetry, the APA agent may determine that the refactor is a successful fix for the issue, and updates the APA agent's internal prompt templates or retrieval memory to prioritize this approach in future tasks. The APA agent may also generate a pull request with the refactored code and supporting test results, attaches a reasoning summary and telemetry evidence, and logs this improvement as a success case for future reuse. Now, the APA agent has evolved-next time a similar latency issue appears in another service, the APA agent may proactively consider recursive function refactoring as a high-probability fix.

FIG. 8 illustrates an example environment 800, in which an AI enabler of the APA system 110 is able to a unified scheduling layer across geographically distributed GPU infrastructure, in accordance with one or more embodiments. There is a master Kubernetes™ cluster and an edge Kubernetes™ cluster in the environment 800. The master Kubernetes™ cluster is where the APA control plane resides. The master Kubernetes™ cluster includes nodes 1 and 2, which are standard Kubernetes™ nodes running within the master cluster. The master Kubernetes™ cluster also includes a virtual node 3, which is created by a particular project, e.g., "project omni". The virtual node 3 acts as a logical placeholder for remote GPU compute capacity. An example task, "pod foo", is scheduled to the virtual node. The pod foo task may be an LLM execution, a sandbox build, etc. Here, the master Kubernetes™ cluster "believes" it is scheduling the "pod foo" locally, but the project omni transparently redirects that scheduling to the edge Kubernetes™ cluster.

The edge Kubernetes™ cluster represents a distributed GPU compute location, potentially in a different cloud region, across different cloud providers, or even entity-owned edge machines, brought online via a bootstrap script. The edge Kubernetes™ cluster includes nodes 3 and 4. For example, the APA control plane needs GPU capacity to run an LLM task. Through the AI enabler and project omni, the APA control plane selects the most cost-effective, available, and low-latency GPU location (e.g., a 3.74/hour A100 GPU in South Carolina), and provisions an GPU node in the selected GPU location. The virtual node 3 is logically bound to the provisioned GPU node. The APA control plane then schedules the pod foo to the virtual node 3, where the pod foo is actually instantiated on the GPU node in the edge cluster.

Once the task is executing on the GPU node in the edge cluster, status updates, logs, and observability data flow back to the master Kubernetes™ cluster via reflection, which keeps the master Kubernetes™ cluster to believe the pod foo is running locally, but APA's infrastructure is silently routing them across regions.

As described above, the AI Enabler facilitates the selection of an optimal geographic GPU region for deploying large language models (LLMs) within the APA system 110. However, this represents only one example use case of the AI Enabler's broader capabilities. While the APA system 110 is a specific application that leverages LLMs, the AI Enabler is not limited to this context. It may likewise be utilized to select GPU deployment regions for LLMs in connection with any other application or by any other entity requiring such functionality.

Without the AI Enabler, developers would need to manually manage multi-cluster scheduling and networking, significantly increasing system complexity. APA tasks—such as applying code fixes, building Docker™ images, and executing test workflows—are not asynchronous batch jobs; they require real-time microservice-level connectivity. The AI Enabler continuously monitors spot GPU pricing and availability to dynamically select the most cost-effective and performant compute location. Even when resources are distributed across regions (e.g., between Ashburn and Oregon), the network latency is approximately 15 milliseconds—negligible when compared to typical large language model (LLM) response times, which range from several hundred milliseconds to a few seconds. In this context, the benefits of reliable GPU access far outweigh the minimal latency overhead, ensuring a seamless experience for both users and APA agents.

In various embodiments, the runbook module 240 includes an interactive module referred to as the APA Runbook Library, which functions as a centralized orchestration interface for executing automation workflows.

Example GUIs

FIG. 9 illustrates an example user interface 900 for a runbook library within an APA system 110, in accordance with one or more embodiments. The Runbook Library presents a collection of pre-configured automation scripts (hereinafter "runbooks"), each targeting a specific class of optimization or remediation activity. These runbooks enable users to systematically improve application performance, reduce infrastructure costs, and harden system security across distributed Kubernetes™ environments.

Each runbook is associated with a defined set of execution prerequisites, including but not limited to: access to observability platforms (e.g., OpenTelemetry™, DataDog™), integration with source code repositories (e.g., Git), and/or Connectivity with continuous integration and deployment (CI/CD) pipelines. These prerequisites ensure that APA can effectively retrieve telemetry data, apply changes via infrastructure-as-code (IaC), and validate outcomes through automated test environments.

In response to user selection (opt-in) of a given runbook, APA initiates a phased execution sequence, typically comprising: (1) data acquisition phase, (2) analysis and planning phase, (3) execution phase, and/or (4) validation and rollback monitoring phase. During data acquisition phase, APA collects relevant telemetry signals, inspects infrastructure manifests (e.g., Helm charts, Kubernetes™ YAMLs), and pulls relevant application source code or build configurations for analysis. During analysis and planning phase, the APA evaluates observed data to identify bottlenecks, misconfigurations, or performance degradation. The APA then constructs a hypothesis-driven plan comprising one or more corrective or optimization actions. During execution phase, the APA initiates actions such as sandbox testing, pull request generation, infrastructure modification (via IaC), or security patching. Execution status is visualized using progress indicators and status bars within the user interface. During validation and roll back monitoring phase, post-deployment metrics are collected and evaluated against predefined benchmarks. If the applied changes result in regression or anomaly, APA initiates rollback protocols to restore system stability.

Throughout the lifecycle of each runbook, engineers retain oversight and control via an interactive interface—e.g., a "View Details" dashboard—which provides real-time status updates, visual indicators, and access to workflow dependencies. These dependencies may include (but are not limited to): associated JIRA™ tickets for issue tracking, linked pull requests for code or IaC changes, and/or environment telemetry snapshots. This interface supports human-in-the-middle control, whereby APA pauses execution at key decision points to await engineer approval or modification. This embodiment ensures that automated actions remain transparent, auditable, and aligned with enterprise change management policies.

In some embodiments, the APA system 110 executes runbooks that implement a hypothesis-driven performance tuning methodology. Each runbook encapsulates a structured automation workflow designed to identify and mitigate performance inefficiencies within distributed software environments, particularly those deployed in Kubernetes™-managed infrastructures.

Figure 10:
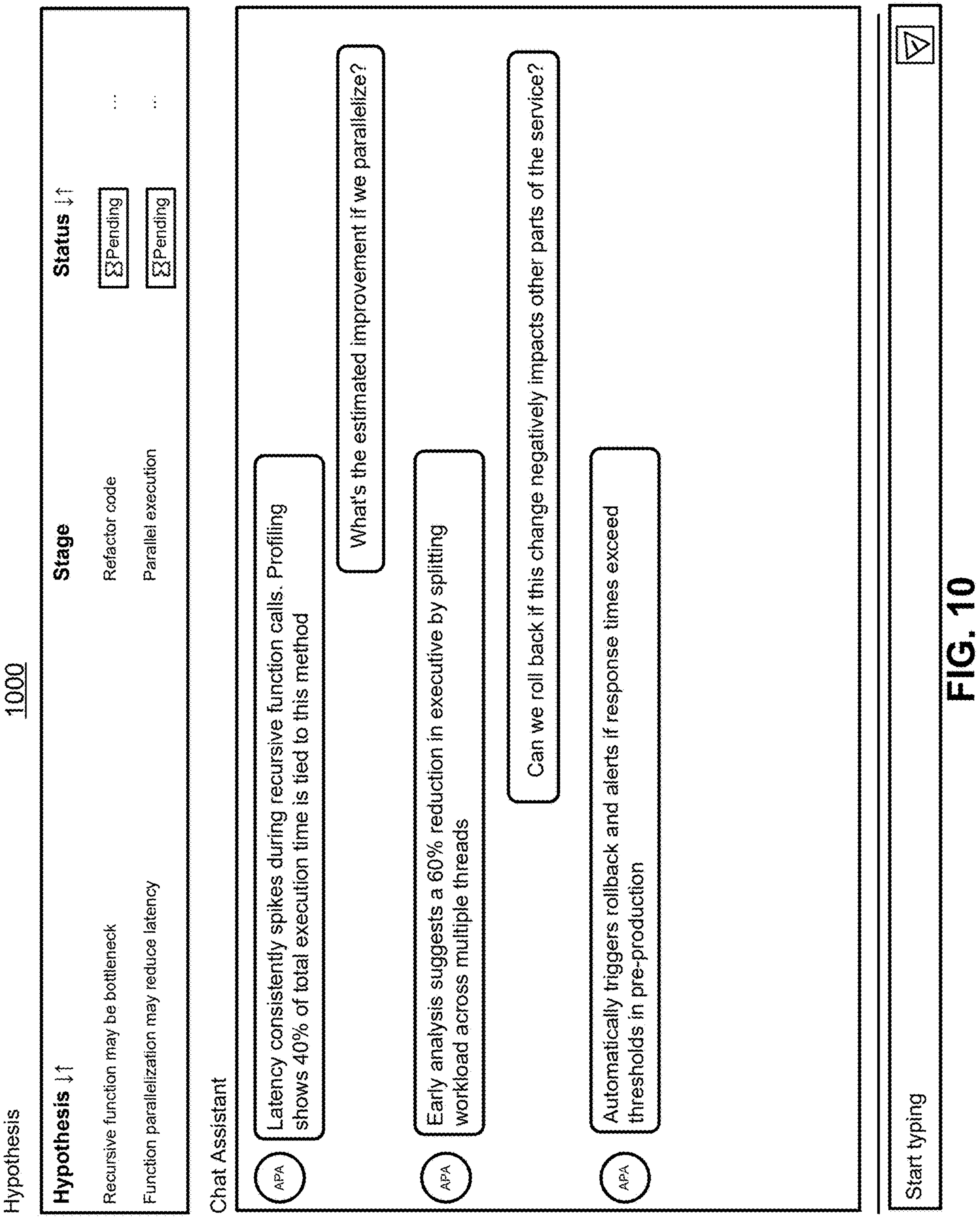
FIG. 10 illustrates an example graphical user interface (GUI) for hypothesis management and conversational interaction with the APA system, in accordance with one or more embodiments.

FIG. 10 illustrates an example graphical user interface (GUI) 1000 for hypothesis management and conversational interaction with the APA system 110, in accordance with one or more embodiments. The GUI 1000 includes a hypothesis panel and an integrated chat assistance window, enabling users to evaluate performance optimization opportunities and interact with the APA system 110 in real time.

The chat assistance window facilitates natural language interaction between the user and the APA system 110. In this example, APA provides contextual information such as: "Latency consistently spikes during recursive function calls. Profiling shows 40% of total execution time is tied to this method;" "Early analysis suggests a 60% reduction in execution time by splitting workload across multiple threads;" and "Automatically triggers rollback and alerts if response times exceed thresholds in pre-production." The user enters natural language queries, including "what's the estimated improvement if we parallelize?" "Can we roll back if this change negatively impacts other parts of the service?" This interface supports human-in-the-loop automation, allowing users to explore, refine, and approve or reject APA-generated optimization proposals. It enhances transparency, fosters explainability in automated decisions, and enables rollback safety mechanisms via conversational prompts.

The hypothesis panel lists two hypothesis, namely (1) recursive function calls and/or (2) suboptimal database queries. For recursive function calls, identified through static code analysis and runtime profiling, recursive functions are evaluated for their execution overhead and potential for optimization via iterative or parallelized alternatives. For suboptimal database queries, Query patterns are analyzed for redundancy, latency impact, and cacheability. The APA system 110 may recommend introducing caching mechanisms or restructuring query logic.

In response to identification of such inefficiencies, APA generates one or more optimization proposals. These proposals are delivered to the engineering team in the form of automated pull requests (PRs), which may include refactored application source code, modified configuration files or Helm charts, and/or supporting performance metrics and telemetry data. In some embodiments, each PR may be subject to human-in-the-loop review and approval, preserving developer oversight and compliance with change management protocols. Alternatively, some PRs may be merged into a particular code version directly without human review.

As the runbook executes, APA continuously monitors the impact of proposed changes within a pre-production (staging) environment. Performance improvements are measured against established benchmarks (e.g., latency thresholds, throughput targets). Upon validation, changes may be promoted to production.

To safeguard system integrity, APA is further configured to detect and respond to regressions. In the event that post-deployment metrics fall outside acceptable ranges (e.g., increased error rates or degraded response times), APA initiates an automated rollback operation, reverting the system to its last known stable state.

In some embodiments, the runbook incorporates a blue/green deployment strategy, wherein the updated environment is brought online in parallel with the existing production environment. Traffic is gradually routed to the new deployment, allowing APA to evaluate system health prior to full transition. This iterative deployment mechanism enhances reliability and minimizes disruption.

Runbooks following this hypothesis-validation-execution cycle have demonstrated latency reductions, scalability gains, and/or cost efficiency. In particular, microservice request latency decreased by up to 90% in tested deployments. Optimized workloads exhibit improved resource utilization and scale more predictably. Reduced infrastructure usage leads to lower operational expenses over time.

Figure 11:
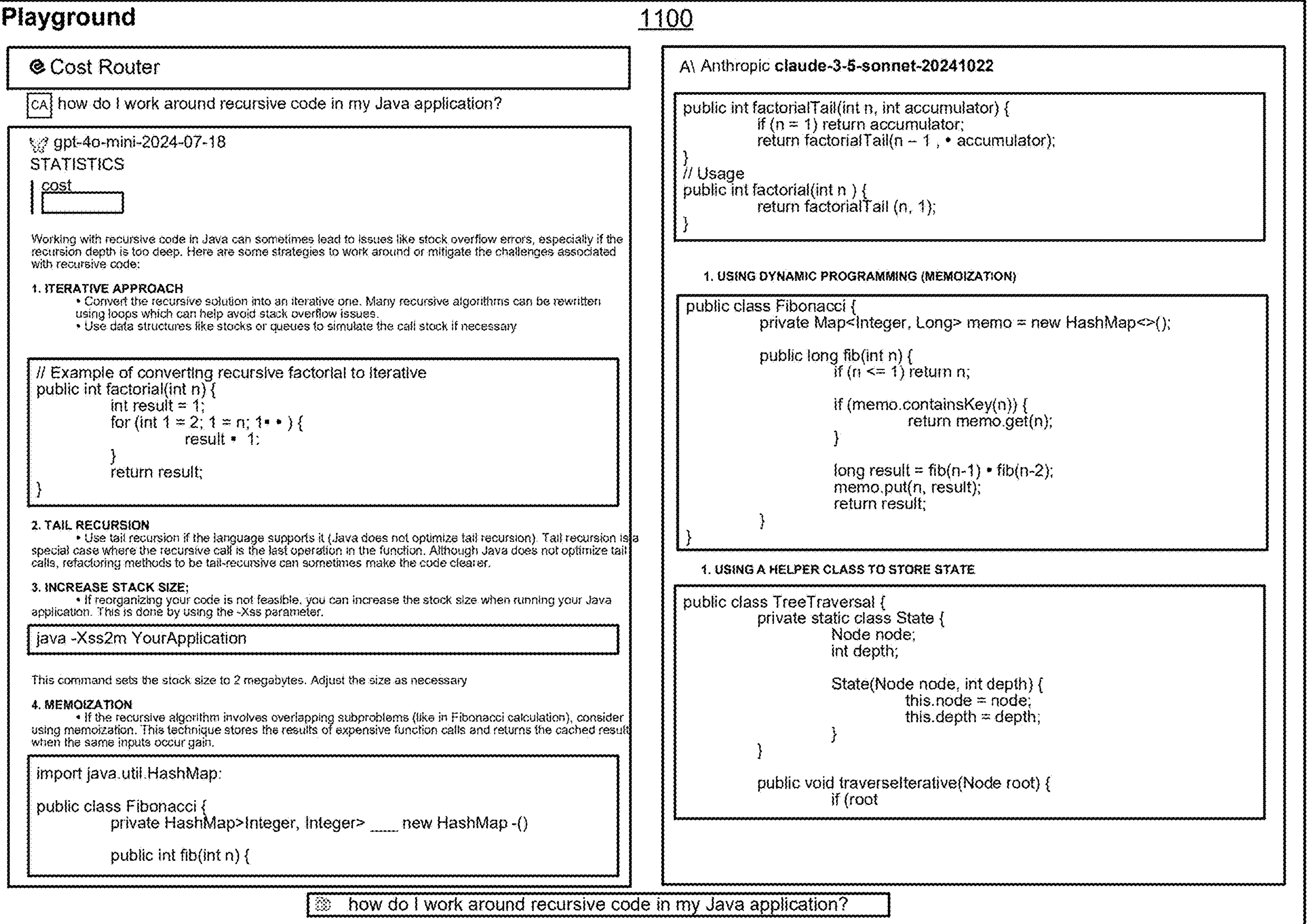
FIG. 11 illustrates an example GUI for the APA system including a multi-agent AI programming assistant, in accordance with one or more embodiments.

FIG. 11 illustrates an example GUI 1100 for the APA system 110 including a multi-agent AI programming assistant, in accordance with one or more embodiments. The GUI 1100 is configured to provide developers with real-time, side-by-side AI-generated suggestions, explanations, and code samples in response to technical programming queries. As illustrated, the GUI 1100 includes multiple panels. At the bottom, a user entered a prompt: "how do I work around recursive code in my Java application?"

A left panel displays a response is generated by an LLM (gpt-40-mini-2024-07-18), which includes both textual explanations and embedded code snippets. The response provides multiple strategies including (1) iterative approach, (2) tail recursion, (3) increase stack size, and (4) memorization. Sample code is presented within boxed code blocks.

A right panel provides an alternate response and code samples for the same prompt by another LLM "Anthropic claude-3-5-sonnet-2024022." The response also provides multiple strategies including (1) using dynamic programming (memorization) and (2) using a helper class to store state.

The GUI 1100 enables simultaneous multi-agent responses to a developer query, allowing users to compare different models' approaches and solutions side-by-side. The design supports code education and explanation, strategy evaluation (iterative vs. recursive), and/or enhanced decision-making through multi-perspective outputs.

FIG. 12 illustrates another example GUI 1200 for the APA system 110 that automatically generates updated code and a pull request, in accordance with one or more embodiments. The GUI 1200 includes a code diff viewer and a pull request review pop-up window. The code diff viewer displays a side-by-side visual comparison (diff) between two versions of a Dockerfile. The diff corresponds to a security patch generated by the APA system 110. In response to generating the updated Dockerfile, the APA system 110 creates a pull request, which triggers the pull request review window to appear. A user may leave comments and submit their review of the proposed changes.

Figure 13:
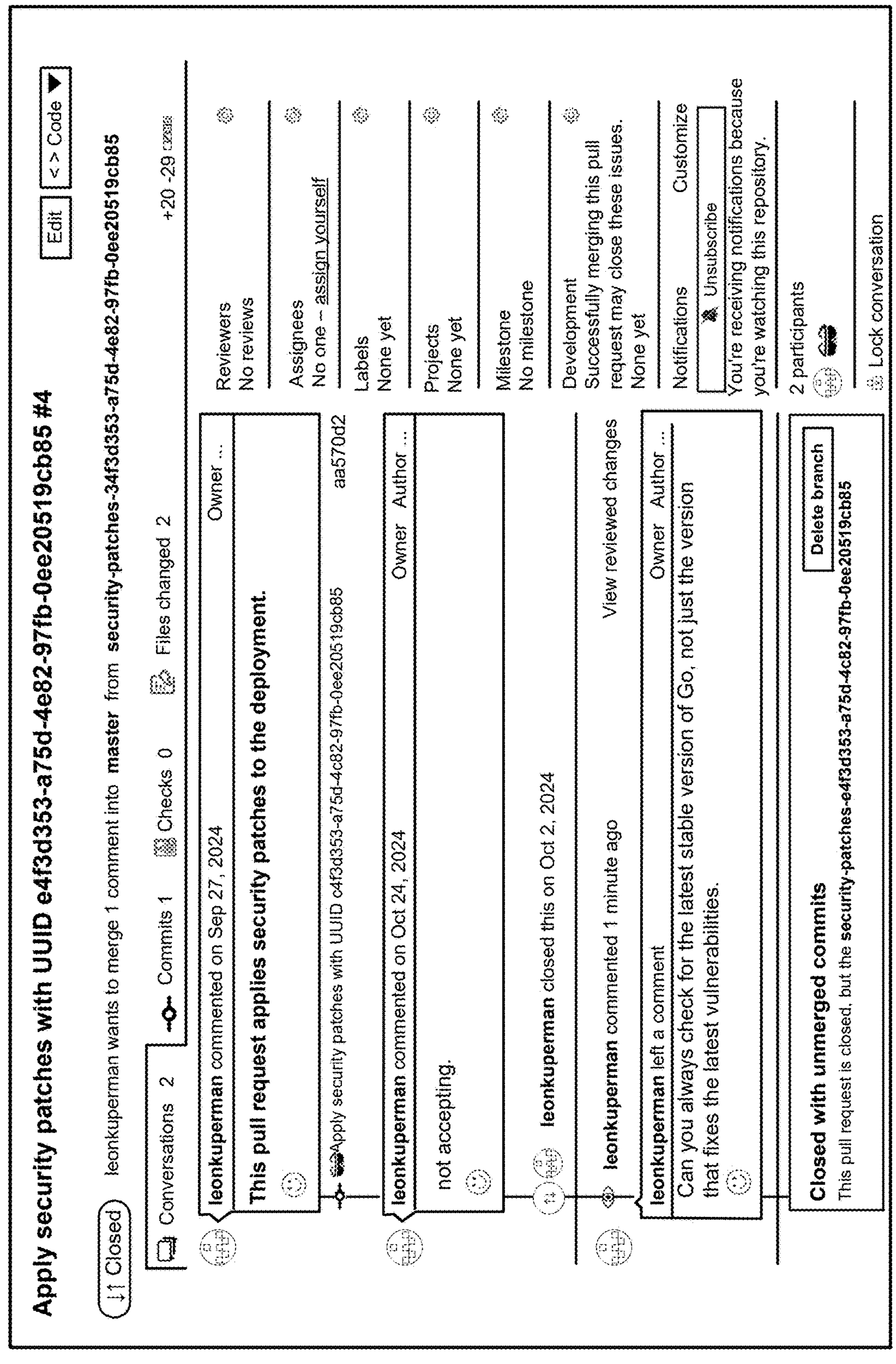
FIG. 13 illustrates another example GUI for the APA system that manages a pull request review and discussion with a collaborative version control platform, in accordance with one or more embodiments.

FIG. 13 illustrates another example GUI 1300 for the APA system 110 that manages a pull request review and discussion with a collaborative version control platform (e.g., GitHub™), in accordance with one or more embodiments. The GUI displays a closed pull request titled: "Apply security patches with UUID e4f3d353-a75d-4e82-97fb-0ee20519cb85 #4." This PR proposes to merge one commit from a feature branch named security-patches-,UUID>into the main branch. The GUI 1300 also includes a conversation thread, including chronological comments, such as "The submitter (leonkuperman) comments on Sep. 27, 2024, explaining that the pull request applies security patches to the deployment;" "On Oct. 2, 2024, the same user rejects the change with the comment: "not accepting" among others. A follow-up comment from the same user, time-stamped as "1 minute ago," suggests an enhancement:" Can you always check for the latest stable version of Go, not just the version that fixes the latest vulnerabilities."

As such, the GUI enables users to view and comment on APA proposed changes, accept or reject merges, suggest improvements (e.g., upgrade strategy refinement), and track review status and integration progress.

The APA system 110 can also analyze the user comments and incorporate them into future code suggestions. In some embodiments, when users leave comments on APA-generated pull requests (e.g., in GitHub™, GitLab™, or Bitbucket™), the workflow integration module 290 and the git integration module 260 can ingest and store those comments as part of the structured metadata associated with a particular runbook execution or code change. In some embodiments, the APA system 110 may tag each comment with metadata such as: associated runbook or module (e.g., "security patch", "resource optimization"), file and line reference, and/or whether the suggestion was accepted or rejected.

The AI enabler 230 can incorporate a fine-tuned or prompt-augmented feedback mechanism where previously recorded comments are used to refine future code proposals for similar issues (e.g., "user latest stable version, not just vulnerability fix"), avoid repeating rejected patterns or offer suggestions aligned with previous user preferences.

Over time, the APA system 110 may develop a preference model for each team and/or user, leveraging recurring feedback patterns to align with organizational coding practices or deployment policies. In some embodiments, feedback storage and reuse would be governed by the customer's privacy policies, and all data may remain within the customer cluster via sandbox execution to ensure no sensitive information is shared externally.

FIG. 14 illustrates an example LLM schema 1400 that guides how the APA system 110 constructs an LLM prompt to ensure consistent response from an LLM, in accordance with one or more embodiments. Notably, each application has its own context, objectives, and environmental constraints. The APA system 110 retrieves such application-specific information, and applies the information into an LLM schema. As illustrated, the schema includes multiple labeled fields, each representing a distinct component of the optimization reasoning process. An example schema may include the following sections: (1) task (which is a brief, natural language description of the optimization objective to be addressed, e.g., "optimize cluster costs: consolidate node templates"), (2) reasoning (which is contextual background, constraints, and justification for why the task is necessary, including analysis of current infrastructure state, detected inefficiencies, or customer-defined goals), (3) proposed solutions (which is a list or narrative explanation of viable solutions the LLM should consider or evaluate, e.g., "move workloads from templates B and C to A if no hard constraints exist; otherwise, harmonize node selector rules."); and implementation plan (which includes step-by-step actions or Terraform™/Kubernetes™ configurations the APA system 110 may generate or propose to implement the optimization, e.g., "update helm chart to reflect default template usage; adjust tolerations; verify impact with sandbox test.").

In some embodiments, the schema supports multiple task entries within a single prompt, allowing batch evaluation of different optimization domains (e.g., autoscaler tuning, scheduled rebalancing, node right-sizing). Each task adheres to the same structural schema, enabling scalable and explainable reasoning across APA runbooks.

In some embodiments, the LLM prompt schema may be encoded as plaintext, YAML, or JSON, and is submitted to an LLM endpoint (e.g., via LiteLLMModel_call_) to ensure consistent reasoning aligned with platform policies and customer preferences.

Example Methods for Optimizing Application Performance

Figure 15:
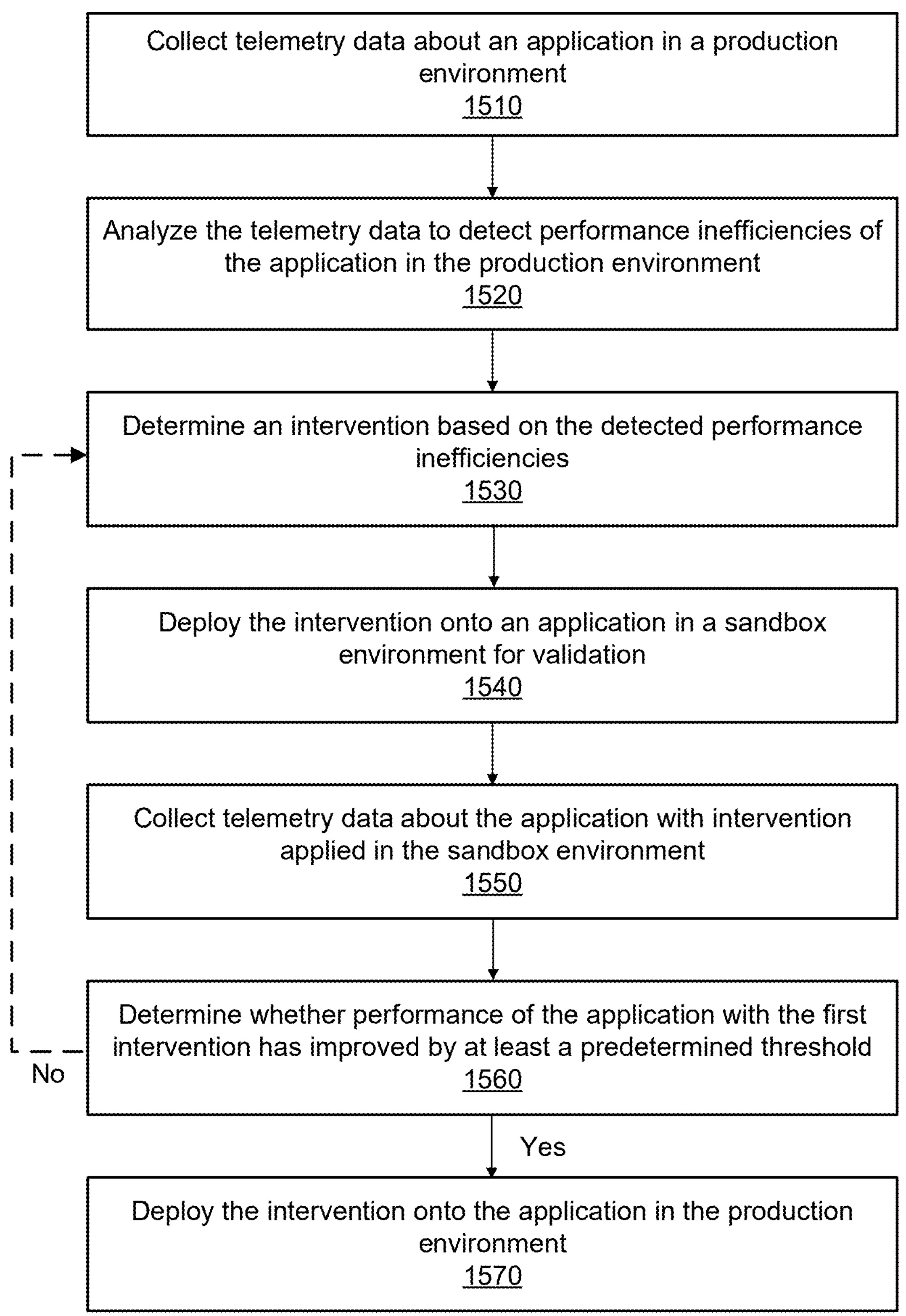
FIG. 15 illustrates an example method for optimizing application performance in accordance with one or more embodiments.

FIG. 15 illustrates an example method 1500 for optimizing application performance in accordance with one or more embodiments. In alternative configurations, different and/or additional steps may be included in the method 1500. The method 1500 may be performed by the APA system 110 described herein.

The APA system 110 collects 1510 telemetry data about an application in a production environment. In some embodiments, the APA system 110 integrates with observability platforms like Datadog™ or Dynatrace™ and uses OpenTelemetry™ standards to collect logs, metrics, and traces. The logs may include timestamped text records that describe discrete events in the system. For example, a security log may be:

2025-04-10T15:47:55Z WARN [AuthService]—Unauthorized login attempt from IP 192.168.1.12

Metrics include numerical measurements collected over time, which can be used for monitoring system health and performance trends. For example, CPU usage may be recorded as:

cpu usage {pod="api-server"}=74.3%

Traces are end-to-end records of a request or transaction as it flows through various services or components of an application, which may be used for debugging performance bottlenecks or errors in microservices. A trace of a user signing up on a website may be:

Trace ID: 98e3-2a9f-44ab

Span 1: frontend receives request (20 ms)

Span 2: frontend calls auth-service (30 ms)

Span 3: auth-service calls database (50 ms)

Span 4: frontend responds to user (10 ms)

The APA system 110 analyzes 1520 the telemetry data to detect performance inefficiencies of the application in the production environment. In some embodiments, the APA system 110 employs various AI-powered agents, each with specific roles that collaborate to detect, reason about, and resolve performance inefficiencies. In some embodiments, the AI-powered agents include a research agent configured to scrape documents, queries observability tools, pulls Git metadata (e.g., commit history, test coverage), and reads file content and checks configs. For example, the research agent may gather Kubernetes™ resource specification and usage history to evaluate resource bottle neck. In some embodiments, the research agent configured to analyze telemetry data to form hypotheses about inefficiencies. The research agent may also cross-reference source code, IaC, and Kubernetes™ manifests and/or read documentation (e.g., APA system 110 specification and/or OpenTelemetry™ guidelines). For example, the research agent may determine that latency is due to a recursive function and/or a non-cached database query.

The APA system 110 determines 1530 an intervention based on the detected performance inefficiencies. In some embodiments, the APA system 110 includes a planning agent that evaluates possible solutions and picks a best one based on feasibility and trade-offs. In some embodiments, the planning agent maps out refactor plans or IaC updates, considers impact on workload stability, and determines whether the changes may introduce regressions.

The APA system 110 deploys 1540 the intervention onto an application in a sandbox environment for validation. In some embodiments, the APA system 110 includes an execution agent configured to write and test code and configuration changes. The execution agent may modify source code or deployment YAML, refactors functions, and runs build or test pipelines in the sandbox environment. The sandbox environment (also referred to as "sandbox") may be a temporary Kubernetes™ pod or container inside the customer's environment. It is configured to safely build application code, run tests (unit, integration, or security), simulate configuration changes, and validate optimization hypotheses.

The APA system 110 collects 1550 telemetry data about the application with intervention applied in the sandbox environment. In some embodiments, the APA system 110 spins up and tears down sandboxes on demand to execute workflows for live performance tuning and reasoning. In some embodiments, the APA system 110 uses the sandbox to perform steps, including (but not limited to) build code, run unit tests, security scanning, validate optimizations, terraform™ previews, and compare metrics, forming a closed-loop feedback system, where agents don't just propose changes, they may also prove them.

The APA system 110 determines 1560 whether performance of the application with the intervention has improved by at least a predetermined threshold. For example, the predetermined threshold may include (but is not limited to) ≥20% latency reduction, ≥20% compute resource saving, etc. In response to determining that the performance of the application with the intervention has improved by at least the predetermined threshold, it is considered a success, and the APA system 110 deploys 1570 intervention onto the application in the production environment. In some embodiments, the APA system 110 promotes the change by committing the change to Git as a pull request (PR). In response to approval by a user or auto approved based on configuration, the APA system 110 pushes the change to the production CI/CD pipeline.

In some embodiments, in response to determining that the performance of the application with the intervention has not improved by at least the predetermined threshold, the APA system 110 identifies 1530 another intervention based on the detected performance inefficiencies, deploys 1540 the intervention onto the application in the sandbox environment for validation, collects 1550 telemetry data about the application with intervention applied in the sandbox environment, and determines 1560 whether performance of the application with the intervention has improved by at least the predetermined threshold. This process can repeat as many times as necessary until an intervention with sufficient performance improvement is identified, and that intervention may then be deployed 1570 onto the application in the production environment.

Example Methods for Interactive Code Generation via LLMs

FIG. 16 illustrates an example method 1600 for interactive code generation via LLMs, in accordance with one or more embodiments. In alternative configurations, different and/or additional steps may be included in the method 1600. The method 1600 may be performed by the APA system 110 described herein.

The APA system collects 1610 context about an application running in a cloud environment based on metadata, source code files, and/or configuration files. Metadata includes (but is not limited to) annotations, labels, or workload descriptions. Source code includes (but is not limited to) application code, functions, database access logic. Configuration files includes (but is not limited to) Terraform™ files, Helm™ charts, Kubernetes™ YAMLs, and IaC configuration files.

The APA system 110 collects 1620 metrics data associated with performance of the application. As described above, telemetry data includes (but is not limited to) metrics, logs, and traces, and the telemetry data may be obtained from observability platforms like Datadog™ or Dynatrace™.

The APA system 110 generates 1630 an LLM prompt based on the collected context of the application, metrics data associated with performance of the application, and a prompt schema. A prompt schema is a structured format or template that defines how to build a prompt for an LLM. A prompt schema might define context, task description, performance data, constraints, output format, among others. An example may be:

SYSTEM:

You are an expert DevOps assistant. Your job is to improve application performance.

INPUT:

Source Code Context: [paste from repo]

Telemetry Data: CPU 92%, Latency 1.5 s

Problem: Node templates are too fragmented

Objective: Consolidate templates and reduce CPU overhead to

<10%

INSTRUCTIONS:

Propose changes to Terraform and Helm configs.

Note: In some embodiments, the prompt may be significantly longer—tens of thousands of words or tokens. A different prompt schema may be selected depending on the specific LLM being used, in order to maximize the allowable token count. Providing more context to the LLM can potentially enable it to generate more sophisticated solutions.

The APA system 110 transmits the LLM prompt 1640 to an LLM, prompting the LLM to suggest (1) a modification to one or more source code files or configuration files to improve performance of the application, and (2) rationale of the suggested modification in natural language. The APA system 110 receives 1650 output from the LLM including a suggested modification to one or more source code or configuration files and rationale of the suggested modification. The APA system 110 presents 1660 the suggested modification and the rationale of the suggested modification on a client device of a user for display.

In some embodiments, the suggested modification is presented to the user as a pull request. Referring back to FIG. 12, a proposed security patch is presented to the user in the form of a GitHub™-style pull request. The code on the left shows the original insecure Dockerfile, and the code on the right shows the suggested changes, such as changing the base image from Debian™:10 to a more secure and optimized golang:1.21.0 image, and removing manual dependency installs and Go setup steps—replaced by a clean, modern base image. Further, a comment box allows users to leave feedback.

A user can accept or reject the modification. In response to receiving a user indication accepting the proposed modification, the APA system 110 merge the proposed modification to code associated with the user. Otherwise, the proposed modification is closed without merging. Referring back to FIG. 13, a user has rejected the APA generated pull request, and generated a comment, stating "can you always check the latest stable version of Go, not just the version that fixes the latest vulnerabilities?" As such, the pull request was closed without merging. In response to receiving the user's comments, the APA system 110 may revise its solution based on the user's comments, and generate a pull request again.

Example Methods for Intelligent Routing LLMs Deployment to Different GPU AZs

Figure 17:
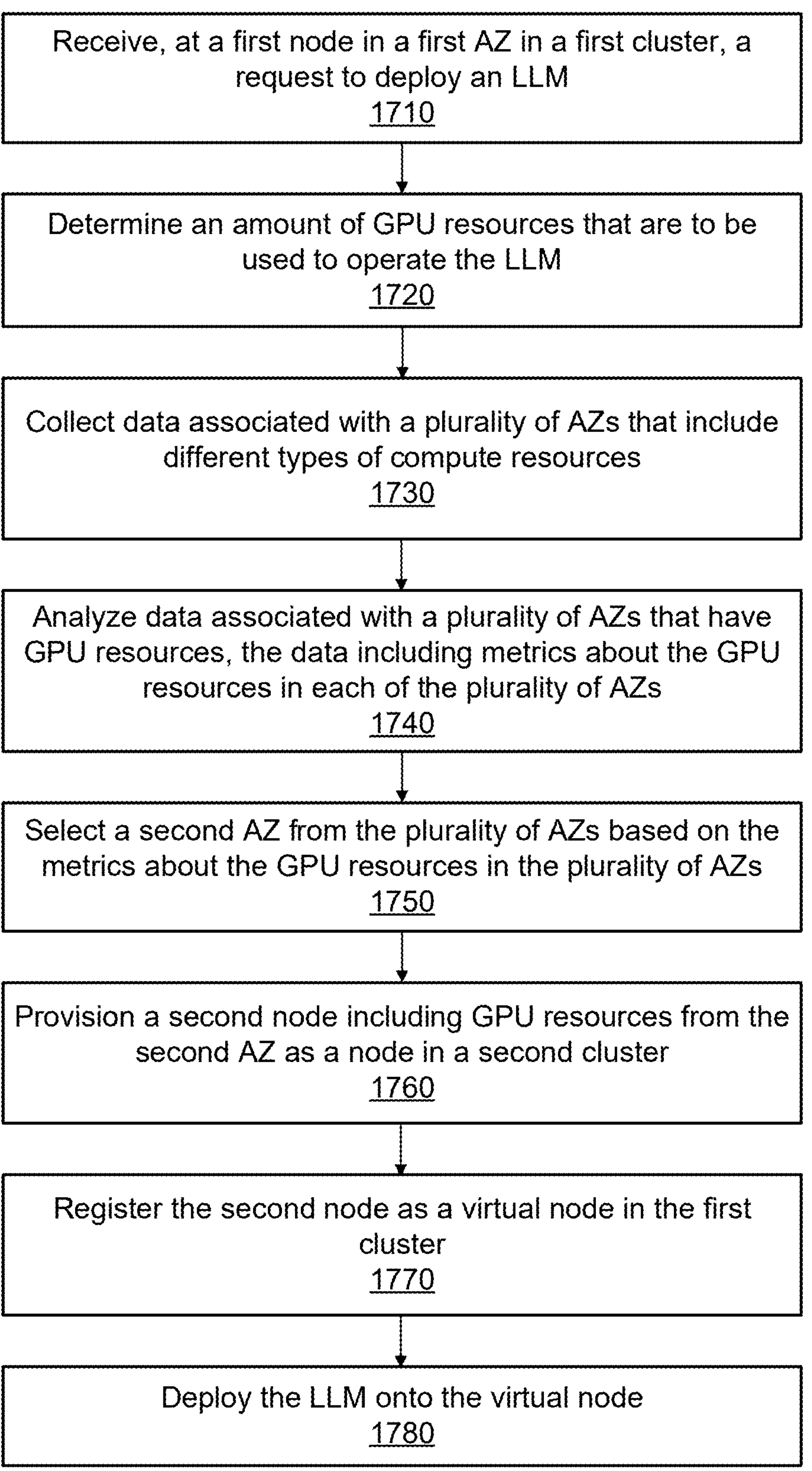
FIG. 17 illustrates an example method for intelligent routing LLMs deployment to different GPU AZs, in accordance with one or more embodiments.

FIG. 17 illustrates an example method 1700 for intelligent routing LLMs deployment to different GPU AZs, in accordance with one or more embodiments. In alternative configurations, different and/or additional steps may be included in the method 1700. The method 1700 may be performed by the APA system 110 described herein.

The APA system 110 receives 1710, at a first node in a first AZ in a first cluster, a request to deploy an LLM. In some embodiments, the first cluster is a master cluster configured to orchestrate workloads in a Kubernetes™ environment. The master cluster may determine that a workload requires an LLM, and generate a request to deploy an LLM to perform the workload. In some embodiments, the workload may be functions of the APA system 110.

The APA system 110 determines 1720 an amount of GPU resources that are to be used to operate the LLM. In some embodiments, the APA system 110 determines GPU requirements for the LLM. For example, the APA system 110 may select a particular model for a code reasoning task. The APA system 110 may determine that the task involves parallel refactoring for multiple services and may require concurrent prompt execution. Based on concurrency needs, the APA system 110 may determine that a minimum GPU requirement is 1 A100 GPU, and preferred GPU requirement is 2 A100 GPU.

The APA system 110 collects 1730 data associated with a plurality of AZs that include different types of compute resources, such as different types of CPUs and GPUs. Such data may be obtained by pulling zone-specific metadata such as GPU instance types, resource availability (e.g., on-demand vs. spot), current and historical pricing, GPU availability, utilization rate, provisioning latency, interruption risk, AZ-to-master latency, compliance tags, among others. The APA system 110 analyzes 1740 data associated with a plurality of AZs that have GPU resources. The data includes metrics about the GPU resources in each of the plurality of AZs.

For example, the APA system 110 has determined that an LLM requires two A100 GPUs for execution. The APA system 110 then evaluates which AZ should be used to provision these GPUs based on the metrics analysis. In some embodiments, each AZ may be associated with GPU availability, current GPU utilization, spot instance demand or on-demand instance demand, historical failure rates or eviction trends, and/or latency. In some embodiments, the APA system 110 may apply a multi-criteria scoring model that weighs multiple metrics, e.g., 40% for GPU availability, 25% for utilization, 10% for latency, and 5% for eviction risk.

The APA system 110 selects 1750 a second AZ from the plurality of AZs based on the metrics about the GPU resources in the plurality of AZs. The APA system 110 provisions 1760 a second node including GPU resources from the second AZ as a node in a second cluster. The APA system 110 registers 1770 the second node as a virtual node in the first cluster. In some embodiments, the second cluster is an edge cluster. Unlike the master cluster configured to orchestrate workloads, the edge cluster is configured to execute workloads. The APA system 110 deploys 1780 the LLM onto the virtual node.

The virtual node acts as a logical placeholder representing the compute capacity of the second node. As a result, the master cluster can schedule workloads to the virtual node using standard Kubernetes™ scheduling mechanism. Although the workload is physically executed in the edge cluster, the scheduling and management appear local to the master cluster, thereby enabling workload delegation without requiring multi-cluster scheduling logic or user intervention.

In some embodiments, the APA system 110 utilizes virtual node registration to maintain logical integration between the master cluster and the edge (second) cluster while preserving operational isolation. The actual execution of tasks, such as LLM inference, sandboxed code builds, or infrastructure remediation, occurs in the second cluster, which may be geographically or logically separated from the master cluster. Despite this separation, the master cluster is able to observe the virtual node and track the status, telemetry, and lifecycle events of workloads scheduled to it. This approach ensures that sensitive operations can be executed securely in remote environments without exposing application code, infrastructure configuration, or proprietary telemetry to the centralized control plane.

In some embodiments, registering the second node as a virtual node in the master cluster allows the APA system 110 to present a unified control interface to users and automation systems, while leveraging the benefits of a distributed, multi-cluster architecture. By abstracting the physical location of the execution environment, the APA system 110 avoids the need to modify existing DevOps pipelines, GitOps flows, or observability tools to be multi-cluster aware. As such, the virtual node abstraction facilitates the delegation of compute-intensive workloads to optimal remote zones, while preserving the simplicity and compatibility of single-cluster operations at the control plane level.

Example Use Cases

The demand for such APA capabilities arises from the convergence of multiple high-growth technological sectors, including observability and Application Performance Monitoring (APM), Kubernetes™ and cloud-native infrastructure orchestration, DevOps and Site Reliability Engineering (SRE) practices, and the emerging domain of Artificial Intelligence for IT Operations (AIOps).

To illustrate the relevance and applicability of the disclosed system, four representative user groups are identified: (1) observability and monitoring users, (2) Kubernetes™ operators and cloud-native application teams, (3) DevOps and SRE practitioners, and/or (4) automation-centric engineering teams. Observability and monitoring users include engineers and operators who rely on platforms such as DataDog™, New Relic™, Dynatrace™, AppDynamics™, Grafana™, and Elastic™ for visibility into system behavior. While these platforms provide extensive telemetry, they lack automated workflows to address detected performance or configuration issues. APA complements existing observability stacks by acting upon the data they generate. For users of such platforms, APA introduces automated remediation capabilities without requiring changes to the monitoring infrastructure. An example use case may be: An engineering team receives high-latency alerts but lacks the time or tools to trace the root cause and deploy a fix. APA bridges this gap by correlating latency with system configuration and proposing targeted optimizations.

Kubernetes™ operators and cloud-native application team include developers, DevOps engineers, and platform teams responsible for managing Kubernetes™ environments-often on managed services such as Amazon EKS™, Azure AKS™, or Google GKE™. These environments are characterized by dynamic scaling, container orchestration, and declarative infrastructure management. APA operates as a native extension within Kubernetes™ clusters, enabling real-time performance tuning, configuration validation, and workload rightsizing. An example use case may be: A platform team managing hundreds of microservices experiences inconsistent resource utilization and infrastructure waste. APA continuously evaluates cluster state and proposes or applies corrective actions such as node template restructuring or workload consolidation.

DevOps and SRE practitioners often emphasize CI/CD, IaC, system reliability, and low mean-time-to-resolution (MTTR) during incidents. Their toolchains include CI/CD pipelines, GitOps workflows, Terraform™ scripts, Helm charts, and incident response platforms. APA enhances these workflows by automating root cause analysis, proposing pull requests to fix issues, and validating fixes in staging environments prior to production rollout. Example use case: An SRE team observes recurring issues caused by misconfigured resource limits. APA detects the misconfiguration, proposes a fix as a version-controlled PR, and supports blue/green deployment testing to verify impact.

Automation-centric engineering teams often seek to minimize manual toil and introduce intelligence into their operational processes. Often familiar with AIOps tools or internal automation frameworks, these users aim to operationalize insights with minimal human intervention. APA enables these teams to extend their automation capabilities from detection to action, leveraging reasoning agents and sandboxed experimentation to ensure safe execution. Example use case: An engineering team builds internal alerting rules but lacks automated follow-up. APA consumes observability data, triggers hypothesis-based workflows, and tests remediations within isolated environments before recommending promotion to production.

Further, the APA system 110 disclosed herein supports cross-functional collaboration across all four user groups. Key usage patterns include (1) integration with existing observability and GitOps pipelines, (2) pull request generation for infrastructure and code changes, (3) Kubernetes™-native deployment with secure, sandboxed execution, and (4) human-in-the-loop workflows that preserve transparency and control.

Several factors further contribute to the demand of the APA system 110 include (1) increasing system complexity, (2) time constraints and skill gaps of users, (3) adoption of GitOps and IaC, and (4) need for security and compliance. In particular, as cloud-native applications scale, performance tuning becomes more difficult to manage manually. Automation reduces the need for constant DevOps or SRE intervention, enabling smaller teams to operate larger systems. APA aligns with infrastructure managed via version-controlled code, allowing for transparent, reproducible changes. Teams responsible for regulated workloads benefit from APA's ability to enforce security best practices and maintain traceable change history.

To further illustrate the functionality and advantages of the APA system 110, a few representative use case scenarios are presented herein. Each use case demonstrates the operation of the APA system 110 through a defined sequence of phases, including: (i) observation of telemetry data and system behavior, (ii) formulation of one or more hypotheses regarding potential optimizations or fault conditions, (iii) execution of corresponding actions, and (iv) validation of outcomes based on predefined performance criteria. This structured process enables continuous system improvement while preserving application stability and operational integrity.

Across all described scenarios, the APA system 110 is capable of monitoring both application-layer performance and underlying infrastructure characteristics, generating actionable insights, and implementing remedial or optimization procedures. The efficacy of such actions is assessed against explicit benchmarks (e.g., error rates, latency thresholds, end-to-end test results). If the observed outcomes fall outside of expected bounds, the system is further configured to initiate an autonomous rollback procedure, thereby restoring the system to a known stable state.

In one embodiment, each use case may be implemented as a "runbook"—a structured and repeatable automation workflow that encapsulates a specific optimization or remediation task. These runbooks may be invoked dynamically by the APA agent framework based on runtime conditions. The following sections provide illustrative examples of such runbooks, demonstrating how the APA system 110 operationalizes telemetry data to produce measurable improvements in application performance, cost efficiency, and reliability.

Figure 18:
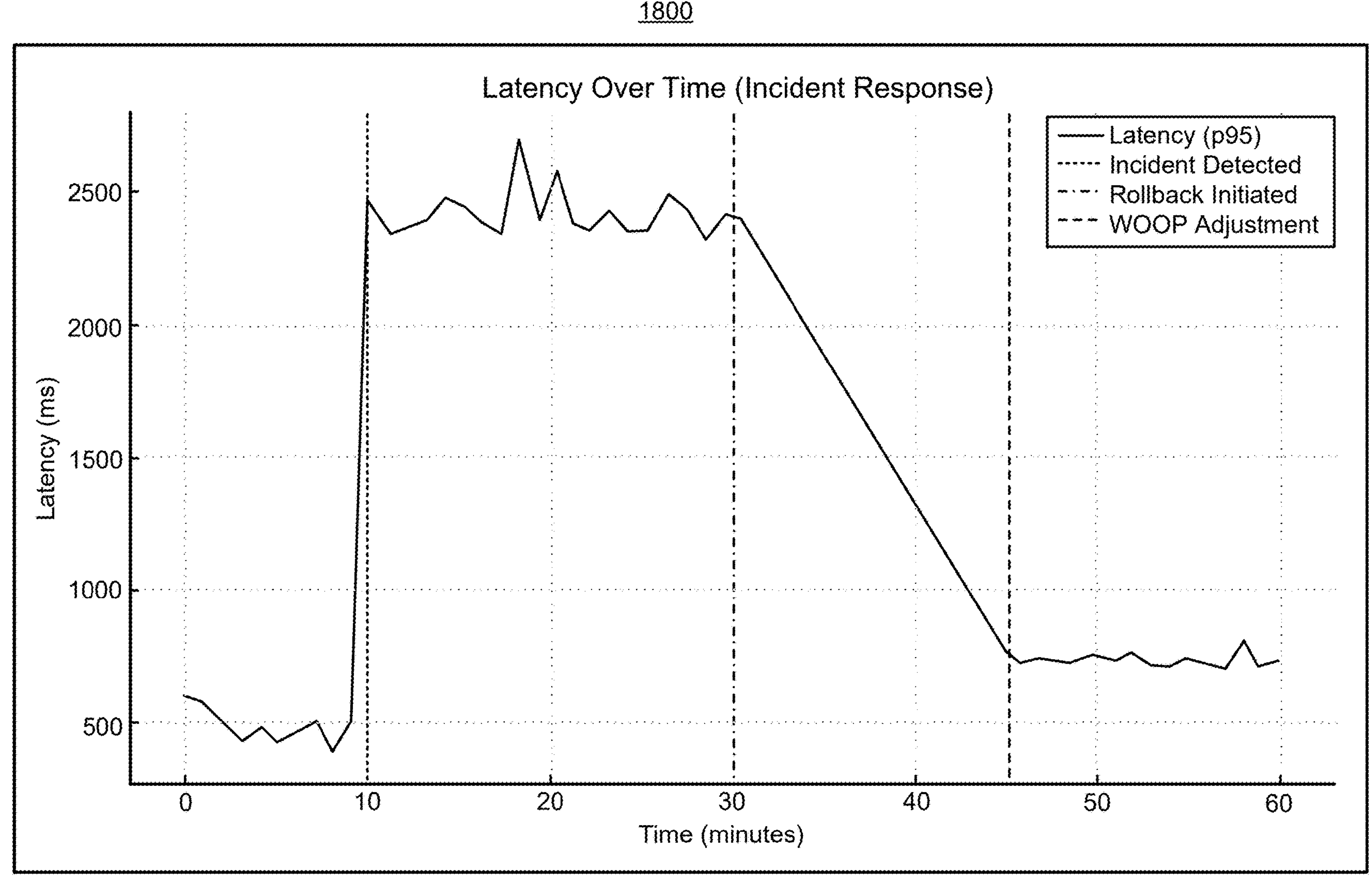
FIG. 18 illustrates a time-series graph depicting latency over time during an incident response workflow managed by the APA system in accordance with one or more embodiments.

Example Use Case 1—Incident Response: Detecting and Resolving High Latency with APA System and Workload Optimization Policy Integration In one exemplary embodiment, the APA system 110 is configured to detect and resolve application latency anomalies in near real-time. FIG. 18 illustrates a time-series graph 1800 depicting latency over time during an incident response workflow managed by the APA system 110 in accordance with one or more embodiments. The vertical axis represents latency (p 95) in milliseconds, while the horizontal axis represents elapsed time in minutes over a 60-minute observation window. The plotted line shows the 95th percentile latency of a monitored service, indicating significant performance degradation followed by automated remediation.

Based on the graph 1800, at approximately 10 minute mark, an alert originating from a third-party observability system (e.g., DataDog™) indicates that the application's 95th percentile response latency has exceeded a threshold of two (2) seconds. In response to detecting the latency incidence, at approximately 30 minute mark, the APA system 110 triggers an automated rollback to the last known stable deployment or configuration. Following rollback, the APA applies a workload optimization adjustment via workload optimization policy integration, which dynamically rightsizes compute resources based on real-time telemetry.

Figure 19:
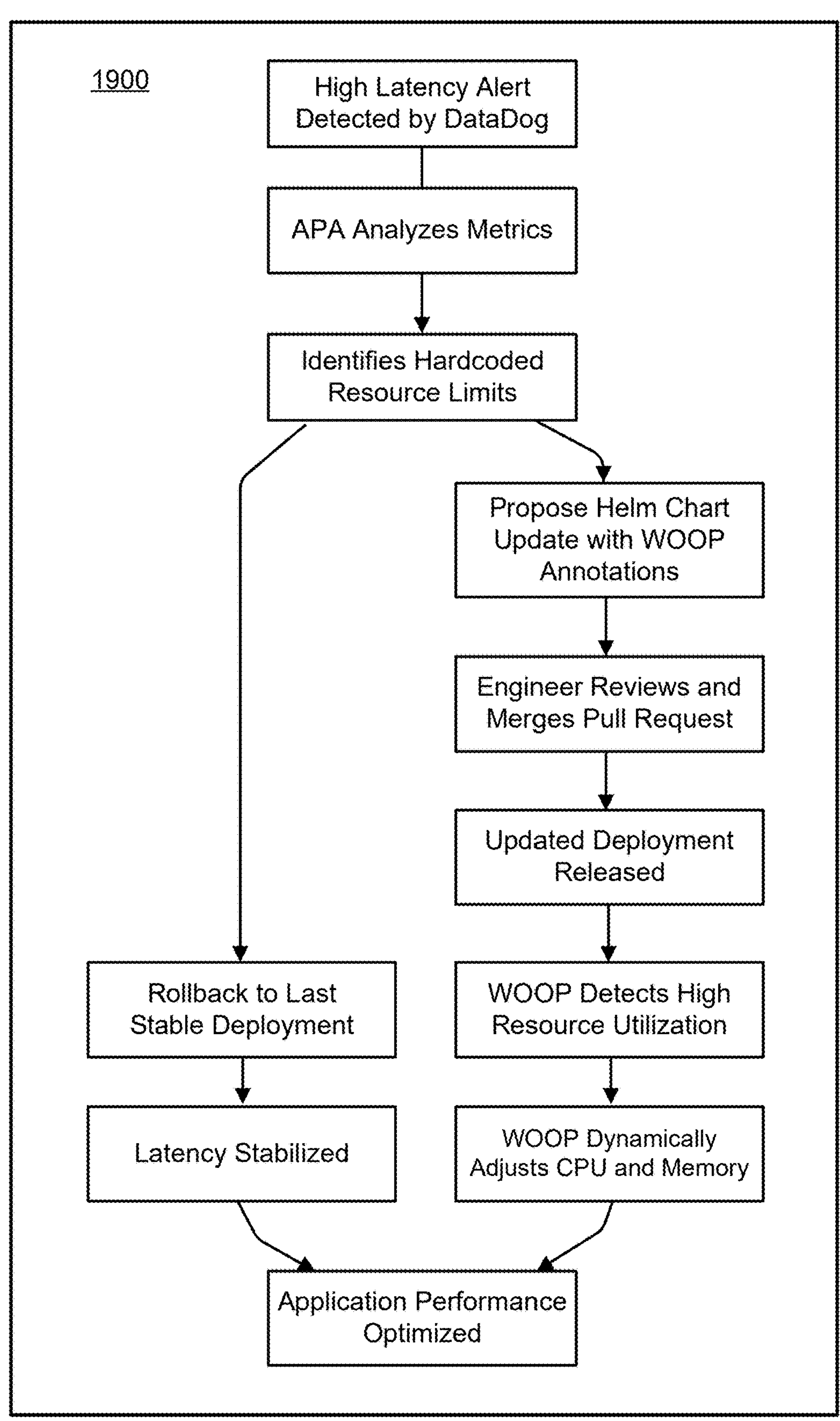
FIG. 19 is a flowchart illustrating an example automated incident response and optimization process managed by the APA systemin response to a high-latency alert (as shown in FIG. 11), in accordance with one or more embodiments.

FIG. 19 is a flowchart illustrating an example automated incident response and optimization process 1900 managed by the APA system 110 in response to a high-latency alert (as shown in FIG. 11), in accordance with one or more embodiments. As shown in FIG. 19, In response to detecting the anomaly, the APA system 110—via its platform-agnostic monitoring agent—initiates a root cause analysis process. The agent collects and evaluates pod-level telemetry data and determines that the CPU utilization of one or more containers is abnormally high, resulting in resource throttling. Further inspection reveals that the resource specifications (e.g., CPU and memory requests and limits) for the affected deployment are statically defined in the associated Helm chart, without support for dynamic adjustment. Notably, the deployment lacks a Workload Optimization Policy annotation, which would otherwise enable adaptive resource allocation based on real-time utilization metrics.

In response to the detected anomaly, the APA system 110 executes a multi-step mitigation sequence as follows: (1) rollback to prior stable state, and (2) optimization policy injection and infrastructure-as-code (IaC) proposal. Regarding rollback to prior stable state, the APA system 110 identifies the most recent known-stable deployment configuration and initiates an automated rollback operation. Upon rollback, application latency metrics return to acceptable levels within a matter of minutes. The engineering team is notified of the rollback event via an integrated communication channel (e.g., messaging platform, alert dashboard, or ticketing system).

Regarding optimization policy injection and IaC proposal, the APA system 110, through its IaC management agent, programmatically generates a proposed update to the deployment manifest encoded in the Helm chart. The proposed update includes workload optimization policy annotations configured to enable dynamic workload rightsizing. The system then formulates a pull request (PR) directed to the customer's Git repository, the PR comprising: (1) a modified Helm chart containing the necessary optimization annotations, (2) supporting evidence derived from the APA agent's analysis, including resource usage statistics and performance impact metrics, and/or (3) deployment guidance specifying how to release the updated configuration in the target environment.

This remediation workflow allows the APA system 110 to not only respond to performance degradation in a timely manner but also to implement structural improvements that preempt future occurrences of similar anomalies.

Following review and approval of the proposed pull request, the updated deployment configuration—now incorporating workload optimization annotations—is merged into the version control system. A continuous integration/continuous deployment (CI/CD) pipeline subsequently deploys the modified configuration to the production environment.

During runtime, the workload optimization subsystem, integrated with the APA framework, monitors the real-time resource utilization of application pods. Upon detecting elevated CPU and/or memory usage beyond predefined thresholds, workload optimization dynamically adjusts the associated resource requests and limits within the Kubernetes™ environment. These modifications are applied without the need for manual operator intervention or source code changes.

The workload optimization mechanism operates as a closed-loop controller, continuously evaluating telemetry data and applying scaling actions as necessary to maintain optimal performance levels across workloads. This real-time rightsizing capability mitigates the risk of future resource-related performance anomalies and enhances overall application resiliency.

The outcome includes rapid remediation, policy-driven configuration, and autonomous optimization. In particular, application latency returns to acceptable levels within minutes as a result of the APA-initiated rollback operation. The deployed release incorporates dynamic resource management via workload optimization annotations, eliminating reliance on statically defined resource parameters. Ongoing performance tuning and scaling adjustments are executed automatically by the workload optimization subsystem, thereby reducing the likelihood of recurring incidents and alleviating operational burden on engineering teams.

Example Use Case 2—Optimizing Microservice Performance Through Database Caching and Code Refactoring In one exemplary deployment scenario, a customer operating a suite of microservices for data processing workloads integrates the APA system 110 into their existing cloud infrastructure. The customer's environment includes an observability stack powered by DataDog™ and utilizes a system's native autoscaler and Workload Optimization Policy framework for initial resource management.

In response to onboarding, the customer observes immediate improvements in compute resource allocation and cost efficiency, owing to the combined effects of autoscaling and workload rightsizing. However, despite stable infrastructure scaling and the absence of performance anomalies, the customer's engineering team elects to pursue further application-level performance tuning. To this end, the APA system 110 is activated to continuously monitor availability and latency metrics across the deployed microservices.

The APA agent collects and aggregates telemetry data over a multi-day observation period. During this time, the system identifies a microservice exhibiting consistently high latency, with average request processing times ranging between approximately 300-400 milliseconds. Although the latency is within functional bounds, the APA system 110 flags it as a candidate for performance enhancement.

Subsequently, APA conducts a code-level inspection of the microservice's repository. By correlating source code structures with execution profiling data obtained from the integrated observability system (e.g., Application Performance Monitoring via DataDog™), APA isolates two performance bottlenecks: (1) unoptimized database query, and (2) inefficient recursive function.

Regarding unoptimized database query, the APA system 110 identifies a recurring database query that retrieves extensive datasets for each incoming request. The query follows a predictable pattern, indicating potential suitability for caching. The APA recommends deployment of a Database Optimizer (DBO) to assess cacheability of the query in question.

Regarding inefficient recursive function, the APA detects a function responsible for recursive input processing that is invoked ten (10) times per request, consuming an estimated 5-10 milliseconds per invocation. APA determines that the function may be refactored into an iterative form employing parallel execution constructs to reduce overall compute time.

The APA system 110 initiates a multi-pronged optimization workflow comprising the following actions: (1) database monitoring with DBO, and (2) function refactoring and source code modification.

Regarding database monitoring with DBO, the APA system 110 provisions the DBO module to observe query patterns originating from the microservice. After a 24-hour monitoring window, DBO reports that the target query could achieve an estimated cache hit rate of 80% with appropriate caching mechanisms. Cacheable queries are projected to execute in approximately 1-2 milliseconds, while non-cacheable queries would remain at roughly 150 milliseconds—yielding a projected average query latency reduction of ~50%.

Regarding function refactoring and source code modification, the APA system 110 generates a new development branch and submits a pull request (PR) comprising a refactored implementation of the recursive function The revised function employs a parallelized, iterative approach, reducing execution time to approximately 1-2 milliseconds per call.

Figure 20:
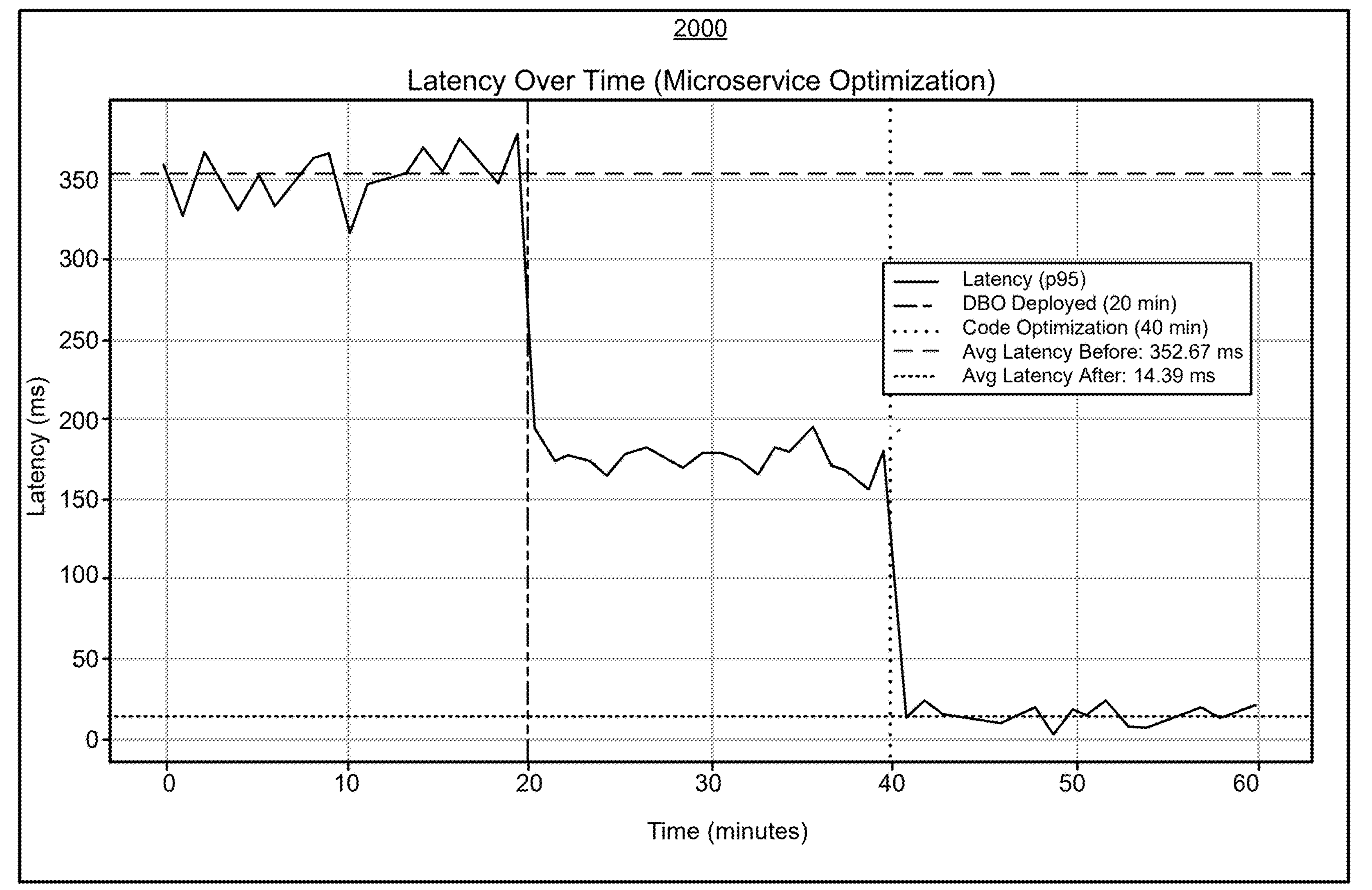
FIG. 20 illustrates a time-series graph showing latency over time during a microservice optimization workflow managed by the APA system, in accordance with one or more embodiments.

FIG. 20 illustrates a time-series graph 2000 showing latency over time during a microservice optimization workflow managed by the APA system 110, in accordance with one or more embodiments. The vertical axis represents latency (p 95) in milliseconds, and the horizontal axis represents elapsed time in minutes over a 60-minute period. The solid line represents the 95th percentile latency of a monitored microservice, reflecting changes in system performance following two key interventions. At approximately 20 minutes mark, a database optimizer (DBO) is deployed. A significant drop in latency occurs shortly after this point, indicating that database query improvements (e.g., caching or query plan optimization) have contributed to a reduction in processing time. At approximately 40 minutes, a code0level optimization is performed, such as function refactoring or parallel execution, leading to a further dramatic decrease in latency.

In particular, the average per-request latency is reduced from 300-400 milliseconds to approximately 10-20 milliseconds, representing a performance improvement of approximately 90%. The reduced processing time results in lower CPU consumption, thereby improving infrastructure utilization and reducing operational cost. The APA system 110 remains active post-deployment, continuously monitoring the microservice and generating further recommendations as system conditions evolve.

Example Use Case 3—Optimizing Node Templates to Reduce CPU Overhead

In one illustrative embodiment, the Application Performance Automation (APA) system is employed to improve compute resource efficiency within a Kubernetes™-based cluster environment. At the start of a monitoring interval (e.g., Monday morning), the customer's engineering team reviews the cluster's performance data, specifically CPU utilization metrics. Despite existing autoscaling mechanisms, the efficiency report indicates that average CPU overhead across all nodes remains at approximately 18%, exceeding the customer-defined threshold of ten percent 10%.

To address this discrepancy and reduce operational costs, the engineering team inputs a performance objective into the APA system 110 via its runbook configuration interface. The specified optimization target is defined as: "All nodes, across all clusters, should maintain CPU overhead of no more than 10%."

In response to activation of the relevant runbook, the APA system 110 initiates an analysis of the current cluster configuration, including node provisioning strategies and workload distribution patterns. The system identifies that node templates are currently segregated by organizational team ownership (e.g., Teams A through E), with each template supporting a heterogeneous mix of workloads, including microservices, scheduled jobs (such as cron jobs), and stateful sets.

APA queries an AI efficiency scorecard, which reveals a configuration inefficiency caused by workload fragmentation. Based on this insight, APA generates a recommendation to transition from team-centric node segregation to a behavior-centric template model, wherein node templates are optimized for specific workload characteristics.

APA formulates and recommends three behavior-specific node templates as follows: jobs template (configured for bursty, compute-intensive workloads such as cron jobs), service template (configured for long-running, stateless microservices with stable usage profiles), and stateful sets template (configured for persistent workloads requiring high availability and stable storage provisioning).

To implement the proposed architecture, the APA system 110 executes the following steps. First, APA programmatically generates a Terraform™ PR containing: the full configuration definitions for the new behavior-based node templates, supporting justification based on historical resource usage data and workload profiles, and/or an audit log capturing the sequence of recommendations and underlying rationale for each proposed change.

APA scans the deployment manifests of all existing workloads and applies new NodeSelector attributes to reassign workloads based on behavioral characteristics: (1) cron jobs from Teams A and B are mapped to the "Jobs" node template, (2) stateless microservices from Teams C and D are mapped to the "Services" node template, and (3) databases and persistent workloads from Team E are mapped to the "Stateful Sets" node template.

The generated PR is submitted to the customer's DevOps team for human review. APA attaches performance metrics and optimization rationale to facilitate an informed approval process. In response to approval, the Terraform™ configurations are applied. As such, the new behavior-based node templates are instantiated; affected workloads are redeployed with updated node scheduling directives; and the APA continuously monitors post-deployment performance to validate effectiveness.

The outcome includes CPU optimization, improved utilization, and structural simplification. In particular, average CPU overhead is reduced from 18% to approximately 9%, satisfying the customer-defined optimization goal; node utilization becomes more balanced, minimizing compute waste and improving scheduling efficiency; and resource fragmentation due to team-based node allocation is eliminated, resulting in a scalable, workload-centric deployment architecture.

Example Use Case 4—Optimizing Cost Per Million Requests

In one illustrative embodiment, a customer operating a scalable Software-as-a-Service (SaaS) platform integrates the APA system 110 to address rising infrastructure costs. The customer's services generate thousands of microservice transactions per day, placing pressure on the engineering team to enhance throughput and minimize expenditures related to compute, network, and storage resources. To assist in achieving these goals, the customer activates cost reporting features and automation features within the APA system 110.

Upon integration, APA establishes connectivity with the customer's observability pipeline—such as one powered by DataDog™ or any OpenTelemetry™—compliant provider—and begins extracting telemetry data associated with service-level transactions. APA then correlates transaction-level metrics with underlying infrastructure resource consumption to assess cost efficiency across microservices.

During this analysis, APA identifies that the customer's current infrastructure configuration—specifically the selection of compute instances—is based on legacy node group definitions (e.g., use of n1-standard-8 instance types on Google Cloud Platform). These instance selections, while familiar to the engineering team, are not necessarily optimized for current workload characteristics in terms of performance-to-cost ratio, stability, or throughput capacity.

To remediate the identified inefficiencies, APA proposes execution of an empirical experimentation framework. The optimization process includes the following stages: (1) canary deployments for controlled testing, (2) performance monitoring and data collection, (3) performance-cost evaluation, and/or (4) infrastructure update via IaC. During the canary deployments for controlled testing stage, APA initiates limited-scope canary deployments by substituting a subset of microservice replicas with nodes derived from alternative instance families. These deployments are performed in a non-intrusive manner to minimize impact on production workloads.

During performance monitoring and data collection stage, for each instance family under consideration, APA deploys test nodes and continuously monitors key metrics during a defined evaluation window (e.g., 30 minutes). Metrics tracked may include (but are not limited to): request per second (RPS), median (P50) and tail (P95) latency, and cost per CPU cycle or per transaction.

APA performs comparative analysis across the tested instance families using a value-weighted formula that balances cost against performance metrics. The evaluation avoids naïvely selecting the lowest-cost instance, instead prioritizing optimal cost-efficiency based on observed behavior under load.

In response to completion of the experimentation loop, APA generates a Terraform™—based pull request (PR) containing updated NodeTemplate definitions that reflect the recommended instance types for each microservice. The PR includes: (1) new instance configurations tailored to workload profiles, (2) supporting telemetry data and performance justifications, and (3) IaC consistency to preserve repeatable deployment processes. The PR is submitted to the engineering team for human-in-the-loop review and approval.

In one example, a microservice responsible for real-time data enrichment is initially deployed on n1-standard-8 instances. Through experimentation, APA identifies the following: (1) n2d-standard-4 instances provide a 20% increase in throughput at a 10% lower cost; and (2) e2-medium instances, while less expensive, exhibit degraded performance and stability under peak load conditions.

Based on this empirical analysis, APA recommends transitioning the data enrichment microservice to n2d-standard-4 instances, achieving both cost reduction and performance enhancement.

Resulting benefits include compute cost reduction, increased throughput, and operational assurance. In particular, optimized instance selection yields up to 25% savings per microservice in compute expenses. Data-driven selection of instance types results in higher processing efficiency and reduced replica count. The experimentation-driven methodology ensures that infrastructure decisions adapt to evolving workload demands, mitigating risks of overprovisioning and underutilization.

Example Use Case 5—Securing IaC and Application Code

In one embodiment, a customer enables the APA system 110 in conjunction with a Kubernetes™ Security Posture Management (KSPM) module. As part of this integration, a security-focused agent (referred to herein as Kvisor) is automatically deployed across all Kubernetes™ clusters associated with the customer's environment. Within an initial observation period of approximately 30 to 60 minutes, APA acquires sufficient visibility into cluster configurations, container images, and runtime behavior to generate actionable security findings.

Through its integration with the KSPM framework, APA invokes an Attack Path analysis engine that enumerates security vulnerabilities across all containers and correlates them with compliance violations and misconfigurations. While thousands of vulnerabilities may be present, the system applies a risk-weighted prioritization scheme, focusing on exposures most likely to lead to successful compromise based on attack path traversal.

In one such case, APA identifies a deployment running a microservice referred to as go-app, which forms a critical node in a high-risk attack path. The associated container image tagged lkup77/test_vuln_go:1, is discovered to contain 43 critical vulnerabilities, as per vulnerability scanning tools integrated within KSPM.

Further investigation by APA reveals that this high-risk deployment is further compromised by multiple Kubernetes™ misconfigurations, including: (1) service account token mounting, (2) missing security contexts, and (3) secretes management via environment variables. When a service account token mounting is misconfigured, CIS™ Kubernetes™ benchmark 4.1.6 may be violated, which may result in service account tokens being mounted unnecessarily, enabling unauthorized access to Kubernetes™ APIs. As such, malicious or compromised pods could execute privilege escalation attacks, potentially resulting in a full cluster control.

When a configuration misses security contexts, CIS™ Kubernetes™ benchmark 4.6.3 may be violated, which may result in the pod and container definitions lacking explicitly defined security contexts. As such, containers may run with elevated privileges, allowing unrestricted access to the file system and other system resources.

When secretes management via environment variables is misconfigured, CIS™ Kubernetes™ benchmark 4.4.1 may be violated, which may result in sensitive secrets (e.g., API keys, passwords) are exposed via environment variables inside pods. As such, the secrets may be inadvertently logged, misused, or exfiltrated by unauthorized actors, resulting in potential compromise of external systems.

Through this analysis, APA not only identifies critical container vulnerabilities but also establishes a chain of risk amplifiers—i.e., insecure configurations that, when combined with exploitable code, significantly elevate the threat level. The APA system 110 highlights the go-app deployment as a remediation priority and proceeds to formulate a corrective action plan.

Following the identification of multiple Kubernetes™ misconfigurations within the go-app deployment, the APA system 110 further analyzed the container build process by inspecting the Dockerfile responsible for constructing the go-app container image.

The APA reasoning agent retrieved and parsed the following Dockerfile:

```
dockerfile #Use debian: 10 as the base image
FROM debian: 10 #Install necessary dependencies
RUN apt-get update && apt-get install-y--no-install-recommends
\wget \
  ca-certificates \
  & & rm-rf/var/lib/apt/lists/*
ENV GO VERSION 1.21.0
RUN wget https://go.dev/dl/go$ {GO VERSION}.linux-amd64.tar.gz &&
\
  tar-C/usr/local-xzf go$ {GO VERSION}.linux-amd64.tar.gz &&
\
  rm go$ {GO VERSION}.linux-amd64.tar.gz
WORKDIR/app
COPY main.go.
RUN go mod init cast.ai/vulnapp-lk
RUN go build-o server.
EXPOSE 3000
CMD ["./server"]
```

APA flagged the image construction process as a high-risk implementation based on the following factors: excessive surface area, and known vulnerabilities. In particular, the use of a general-purpose base image (i.e., Debian™ 10) introduces numerous binaries and libraries that are unnecessary for the go-app execution, thereby increasing the potential attack surface. The unoptimized image includes multiple unpatched components, as reported by the integrated vulnerability scanner, contributing to over 40 critical vulnerabilities.

To address these security deficiencies, APA initiated a structured remediation plan comprising the following steps: (1) sandbox-based static analysis, and (2) issue registration and planning. During the step of sandbox-based static analysis, APA instantiated an isolated sandbox pod within the customer's Kubernetes™ environment. Within the sandbox, APA cloned the relevant application code, infrastructure-as-code (IaC) artifacts (e.g., Helm charts, deployment YAMLs), and Dockerfile for analysis. A reasoning agent executed dependency mapping and vulnerability inspection across the full configuration stack.

During the step of issue registration and planning, APA programmatically generated tickets (such as JIRA™ tickets) for each identified issue: (1) one ticket addressing the insecure Dockerfile, and (2) individual tickets for each previously discovered Kubernetes™ misconfiguration. APA assigned these tickets to itself via the JIRA™ API to support transparency, tracking, and asynchronous collaboration with the customer's engineering team.

An example of an APA generated revised Dockerfile is shown below. In some embodiments, the APA uses a multi-stage build pattern to minimize image size and eliminate non-essential system components. The secure build process comprises two stages.

```
Revised Dockerfile
#Stage 1: Build the application
FROM golang: 1.21.0 as build
WORKDIR/app
COPY main.go.
RUN go mod init cast.ai/vulnapp-lk
RUN go build-o server.
#Stage 2: Use distroless for runtime
FROM gcr.io/distroless/static-debian12
COPY--from=build/app/server/
EXPOSE 3000
CMD ["/server"]
```

Resulting benefits include significant reduction in image size, elimination of unused binaries and system libraries, removal of hundreds of known vulnerabilities, improved runtime immutability and container isolation.

APA may also propose updated securityContext parameters for the deployment manifest to restrict runtime privileges, recorded in a yaml file shown below:

```
Yaml
securityContext:
  runAsNonRoot: true
  runAsUser: 1000
fsGroup: 472
readOnlyRootFilesystem: true
capabilities:
  drop:
    -ALL
```

For traceability, APA may annotate the deployment YAML with a unique identifier:

```
yaml
annotations:
  security-patch-uuid: "5747b56b-0897-40f1-ba53-8f26d31c433d"
```

APA then performs validation and deployment. In particular, APA may commit the updated Dockerfile and deployment configuration to a new feature branch in the customer's Git repository. Unit tests were executed within the sandboxed environment to validate functional equivalence and detect regressions. APA may then create a pull request for human review prior to merging the changes into pre-production. In response to approval, APA may monitor the CI/CD pipeline to track rollout progression and verify that no adverse performance impacts occurred.

The outcome incudes risk mitigation, autonomous security governance, and auditability. In particular, the attack surface was significantly reduced via container hardening and enforcement of Kubernetes™ best practices. Remediation actions were executed with minimal manual intervention. All changes were traceable through linked JIRA™ tickets and unique configuration annotations, supporting regulatory and compliance reporting.

Example Computing System

Figure 21:
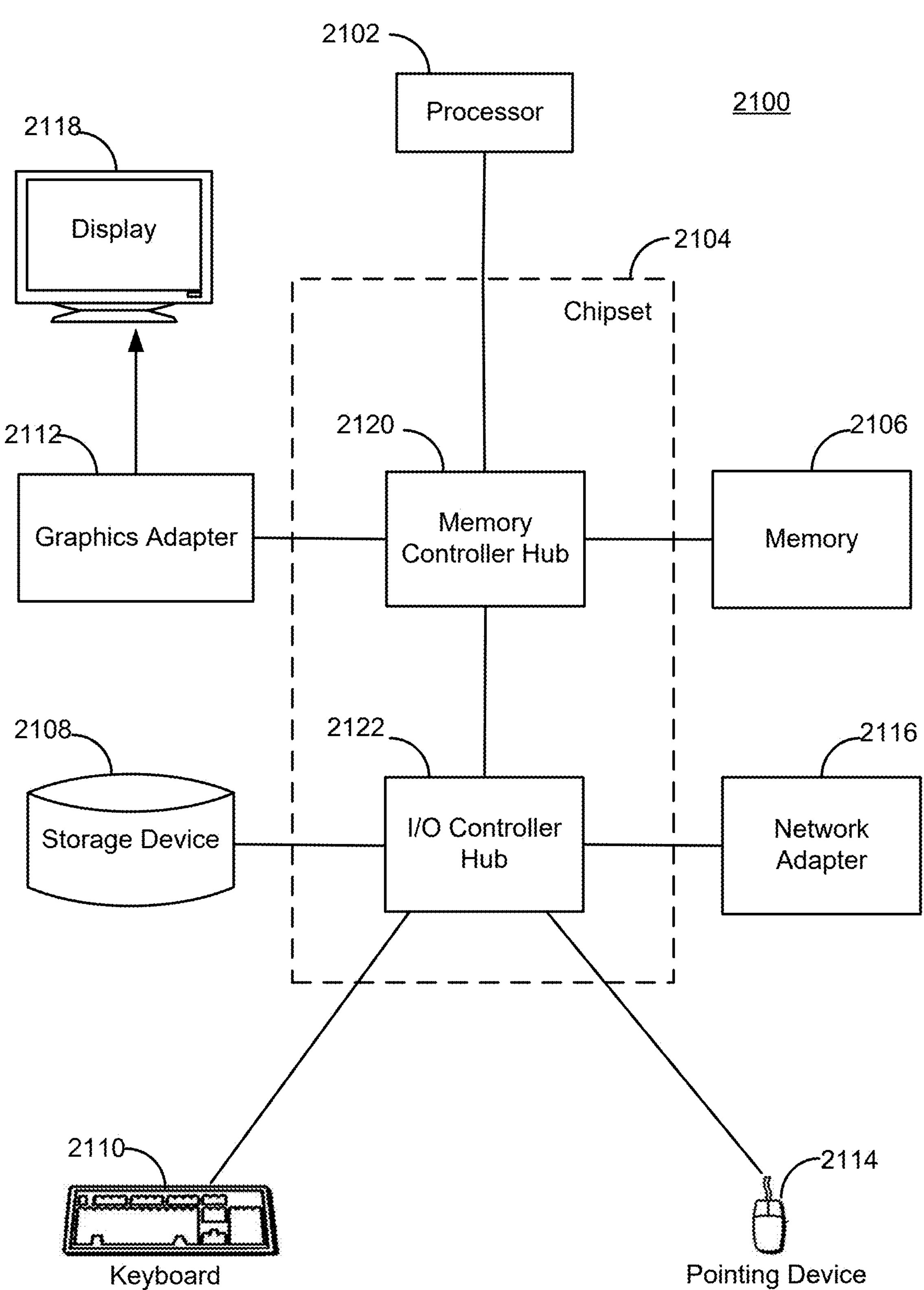
FIG. 21 is a block diagram of an example computer suitable for use in the networked computing environment of FIG. 1.

FIG. 21 is a block diagram of an example computer 2100 suitable for use in the networked computing environment 100 of FIG. 1. The computer 2100 is a computer system and is configured to perform specific functions as described herein. For example, the specific functions corresponding to APA system 110 or LLMs 130 may be configured through the computer 2100.

The example computer 2100 includes a processor system having one or more processors 2102 coupled to a chipset 2104. The chipset 2104 includes a memory controller hub 2120 and an input/output (I/O) controller hub 2122. A memory system having one or more memories 2106 and a graphics adapter 2112 are coupled to the memory controller hub 2120, and a display 2118 is coupled to the graphics adapter 2112. A storage device 2108, keyboard 2110, pointing device 2114, and network adapter 2116 are coupled to the I/O controller hub 2122. Other embodiments of the computer 2100 have different architectures.

In the embodiment shown in FIG. 21, the storage device 2108 is a non-transitory computer-readable storage medium such as a hard drive, compact disk read-only memory (CD-ROM), DVD, or a solid-state memory device. The memory 2106 holds instructions and data used by the processor 2102. The pointing device 2114 is a mouse, track ball, touchscreen, or other types of a pointing device and may be used in combination with the keyboard 2110 (which may be an on-screen keyboard) to input data into the computer 2100. The graphics adapter 2112 displays images and other information on the display 2118. The network adapter 2116 couples the computer 2100 to one or more computer networks, such as network 150.

The types of computers used by the entities and the APA system 110 of FIGS. 1 through 10 can vary depending upon the embodiment and the processing power required by the enterprise. For example, the APA system 110 might include multiple blade servers working together to provide the functionality described. Furthermore, the computers can lack some of the components described above, such as keyboards 2110, graphics adapters 2112, and displays 2118.

In some embodiments, there may be many edge cluster for different entities. Each edge cluster includes a node used for LLM deployment. Each LLM node is registered as a virtual node in the master cluster.

Additional Considerations

The APA system 110 described herein collects and analyzes data associated with prompts to, and responses from, Large Language Models (LLMs), including associated metadata. The APA system 110 uses this collected data to train machine learning models. These machine-learning models are trained to intelligently select and route prompts from applications to different LLMs to achieve desired performance metrics and reduce operational costs. Furthermore, the APA system 110 is capable of dynamically adjusting computational resources, such as GPU utilization, to further enhance operational efficiency.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for large language model (LLM) deployment, the method comprising:

provisioning a first node in a first cluster from a first availability zone (AZ);

receiving, at the first node, a request to deploy a large language model (LLM);

determining an amount of GPU resources that are to be used to operate the LLM;

collecting data associated with a plurality of additional AZs different from the first AZ, the plurality of additional AZs including different types of compute resources, the compute resources including different types of CPUs and GPUs, wherein collected data associated with the plurality of additional AZs includes metrics indicating GPU availability in each respective AZ;

analyzing data associated with the plurality of additional AZs that have GPU resources, the data including metrics about the GPU resources in each of the plurality of additional AZs;

selecting a second AZ from the plurality of additional AZs based on the metrics about the GPU resources in the plurality of additional AZs;

provisioning a second node including GPU resources from the second AZ as a node in a second cluster;

registering the second node as a virtual node in the first cluster, wherein the first cluster schedules a workload associated with deployment of the LLM on the second node notwithstanding that the second node is in a second cluster from the second AZ; and deploying the LLM onto the virtual node, wherein the first cluster tracks status of the workload on the second node notwithstanding that the second node is in a second cluster from the second AZ.

2. The method of claim 1, wherein the first cluster is a master cluster configured to orchestrate workloads, and the second cluster is an edge cluster configured to execute workloads.

3. The method of claim 1, wherein the data includes one or more of: GPU availability, response latency, or spot pricing for each of the plurality of additional AZs.

4. The method of claim 1, the method further comprising:

receiving a task request associated with an application;

selecting an LLM from a plurality of LLMs based on the task request; and deploying the selected LLM onto the provisioned second node.

5. The method of claim 1, the method further comprising:

monitoring performance of the LLM on the provisioned second node; and in response to determining that the performance of the LLM deployed on the provisioned second node is below a predetermined threshold, analyzing metrics data associated with a plurality of AZs that have GPU resources, the data including metrics about the GPU resources in each of the plurality of AZs; and selecting one or more third AZs from the plurality of AZs based on the metrics about the GPU resources in the plurality of AZs.

6. The method of claim 1, the method further comprising:

monitoring runtime performance metrics of the LLM on the virtual node; and initiating dynamic scaling or migration of the LLM based on the monitored performance metrics.

7. The method of claim 1, wherein the first cluster operates as a control plane that maintains an automation system configured to detect performance inefficiencies of operations in the second cluster using the LLM, and the second cluster performs the operations using proprietary code without exposing the proprietary code to the automation system.

8. A non-transitory computer readable storage medium having instructions encoded thereon that, when executed by one or more processors, cause the one or more processors to perform steps comprising:

provisioning a first node in a first cluster from a first availability zone (AZ);

receiving, at the first node, a request to deploy a large language model (LLM);

determining an amount of GPU resources that are to be used to operate the LLM;

collecting data associated with a plurality of additional AZs different from the first AZ, the plurality of additional AZs including different types of compute resources, the compute resources including different types of CPUs and GPUs, wherein collected data associated with the plurality of additional AZs includes metrics indicating GPU availability in each respective AZ;

analyzing data associated with the plurality of additional AZs that have GPU resources, the data including metrics about the GPU resources in each of the plurality of additional AZs;

selecting a second AZ from the plurality of additional AZs based on the metrics about the GPU resources in the plurality of additional AZs;

provisioning a second node including GPU resources from the second AZ as a node in a second cluster;

registering the second node as a virtual node in the first cluster, wherein the first cluster schedules a workload associated with deployment of the LLM on the second node notwithstanding that the second node is in a second cluster from the second AZ; and deploying the LLM onto the virtual node, wherein the first cluster tracks status of the workload on the second node notwithstanding that the second node is in a second cluster from the second AZ.

9. The non-transitory computer readable storage medium of claim 8, wherein the first cluster is a master cluster configured to orchestrate workloads, and the second cluster is an edge cluster configured to execute workloads.

10. The non-transitory computer readable storage medium of claim 8, wherein the data includes one or more of: GPU availability, response latency, or spot pricing for each of the plurality of additional AZs.

11. The non-transitory computer readable storage medium of claim 8, the steps further comprising:

receiving a task request associated with an application;

selecting an LLM from a plurality of LLMs based on the task request; and deploying the selected LLM onto the provisioned second node.

12. The non-transitory computer readable storage medium of claim 8, the steps further comprising:

monitoring performance of the LLM on the provisioned second node; and in response to determining that the performance of the LLM deployed on the provisioned second node is below a predetermined threshold, analyzing metrics data associated with a plurality of AZs that have GPU resources, the data including metrics about the GPU resources in each of the plurality of AZs; and selecting one or more third AZs from the plurality of AZs based on the metrics about the GPU resources in the plurality of AZs.

13. The non-transitory computer readable storage medium of claim 8, the steps further comprising:

monitoring runtime performance metrics of the LLM on the virtual node; and initiating dynamic scaling or migration of the LLM based on the monitored performance metrics.

14. The non-transitory computer readable storage medium of claim 8, wherein the first cluster operates as a control plane that maintains an automation system configured to detect performance inefficiencies of operations in the second cluster using the LLM, and the second cluster performs the operations using proprietary code without exposing the proprietary code to the automation system.

15. A computing system, comprising:

one or more processors; and a non-transitory computer readable storage medium having instructions encoded thereon that, when executed by one or more processors, cause the one or more processors to perform steps comprising:

provisioning a first node in a first cluster from a first availability zone (AZ);

receiving, at the first node, a request to deploy a large language model (LLM);

determining an amount of GPU resources that are to be used to operate the LLM;

collecting data associated with a plurality of additional AZs different from the first AZ, the plurality of additional AZs including different types of compute resources, the compute resources including different types of CPUs and GPUs, wherein collected data associated with the plurality of additional AZs includes metrics indicating GPU availability in each respective AZ;

analyzing data associated with the plurality of additional AZs that have GPU resources, the data including metrics about the GPU resources in each of the plurality of additional AZs;

selecting a second AZ from the plurality of additional AZs based on the metrics about the GPU resources in the plurality of additional AZs;

provisioning a second node including GPU resources from the second AZ as a node in a second cluster;

registering the second node as a virtual node in the first cluster, wherein the first cluster schedules a workload associated with deployment of the LLM on the second node notwithstanding that the second node is in a second cluster from the second AZ; and deploying the LLM onto the virtual node, wherein the first cluster tracks status of the workload on the second node notwithstanding that the second node is in a second cluster from the second AZ.

16. The computing system of claim 15, wherein the first cluster is a master cluster configured to orchestrate workloads, and the second cluster is an edge cluster configured to execute workloads.

17. The computing system of claim 15, wherein the data includes one or more of: GPU availability, response latency, or spot pricing for each of the plurality of additional AZs.

18. The computing system of claim 15, the steps further comprising:

receiving a task request associated with an application;

selecting an LLM from a plurality of LLMs based on the task request; and deploying the selected LLM onto the provisioned second node.

19. The computing system of claim 15, the steps further comprising:

monitoring performance of the LLM on the provisioned second node; and in response to determining that the performance of the LLM deployed on the provisioned second node is below a predetermined threshold, analyzing metrics data associated with a plurality of AZs that have GPU resources, the data including metrics about the GPU resources in each of the plurality of AZs; and selecting one or more third AZs from the plurality of AZs based on the metrics about the GPU resources in the plurality of AZs.

20. The computing system of claim 15, the steps further comprising:

monitoring runtime performance metrics of the LLM on the virtual node; and initiating dynamic scaling or migration of the LLM based on the monitored performance metrics.

* * * * *